US009998649B2

(12) United States Patent
Suki et al.

(10) Patent No.: US 9,998,649 B2
(45) Date of Patent: Jun. 12, 2018

(54) PORTABLE DEVICE, INFORMATION PROCESSING METHOD, AND PROGRAM

(71) Applicant: Sony Corporation, Minato-ku (JP)

(72) Inventors: Yasuyuki Suki, Tokyo (JP); Mayu Kosaka, Kanagawa (JP); Aya Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/134,754

(22) Filed: Apr. 21, 2016

(65) Prior Publication Data

US 2016/0234421 A1 Aug. 11, 2016

Related U.S. Application Data

(63) Continuation of application No. 14/356,277, filed as application No. PCT/JP2012/081754 on Dec. 7, 2012, now Pat. No. 9,350,912.

(30) Foreign Application Priority Data

Dec. 19, 2011 (JP) ................................. 2011-276679

(51) Int. Cl.
*H04N 5/232* (2006.01)
*H04N 5/225* (2006.01)
(Continued)

(52) U.S. Cl.
CPC ....... *H04N 5/23206* (2013.01); *G06F 1/1626* (2013.01); *G06F 1/1686* (2013.01); *G06F 1/1694* (2013.01); *G06F 3/017* (2013.01); *G06F 3/03547* (2013.01); *G06F 3/0488* (2013.01); *G06F 3/04842* (2013.01); *G06F 3/04845* (2013.01); *H04N 5/225* (2013.01);
(Continued)

(58) Field of Classification Search
None
See application file for complete search history.

(56) References Cited

U.S. PATENT DOCUMENTS 8,625,018 B2 * 1/2014 Bilbrey ................ G06F 1/1694
348/333.01
9,350,912 B2 * 5/2016 Suki ..................... G06F 1/1626
(Continued)

FOREIGN PATENT DOCUMENTS

JP 2003-179857 A 6/2003
JP 2009-504098 A 1/2009
(Continued)

OTHER PUBLICATIONS

International Search Report dated Feb. 26, 2013 in PCT/JP2012/081754.
(Continued)

*Primary Examiner* — James Hannett
(74) *Attorney, Agent, or Firm* — Oblon, McClelland, Maier & Neustadt, L.L.P.

(57) ABSTRACT

There is provided a portable device that transmits an image obtained through photographing to another device managed in association with the portable device each time when photographing is performed, receives the image transmitted from the other device each time when photographing is performed in the other device, and displays the image received from the other device.

19 Claims, 23 Drawing Sheets

(51) Int. Cl.
 H04N 5/77  (2006.01)
 G06F 1/16  (2006.01)
 G06F 3/01  (2006.01)
 G06F 3/0484  (2013.01)
 G06F 3/0354  (2013.01)
 H04N 5/44  (2011.01)
 H04N 21/414  (2011.01)
 H04N 21/4223  (2011.01)
 H04N 21/4788  (2011.01)
 G06F 3/0488  (2013.01)
 H04N 5/765  (2006.01)

(52) U.S. Cl.
 CPC ..... *H04N 5/23203* (2013.01); *H04N 5/23245* (2013.01); *H04N 5/23293* (2013.01); *H04N 5/44* (2013.01); *H04N 5/772* (2013.01); *H04N 21/41407* (2013.01); *H04N 21/4223* (2013.01); *H04N 21/4788* (2013.01); *G06F 2200/1637* (2013.01); *G06F 2203/0339* (2013.01); *H04N 5/765* (2013.01)

(56) References Cited

U.S. PATENT DOCUMENTS

| | | | | |
|---|---|---|---|---|
| 2003/0093810 A1* | 5/2003 | Taniguchi | ........ | G08B 13/19656 725/112 |
| 2003/0107654 A1 | 6/2003 | Ohmura | | |
| 2007/0024734 A1* | 2/2007 | Headley | ............. | H04N 1/00127 348/333.07 |
| 2009/0009667 A1* | 1/2009 | Dayan | .................... | G06F 1/1601 348/838 |
| 2009/0091637 A1 | 4/2009 | Suzuki | | |
| 2010/0097489 A1 | 4/2010 | Ohmura | | |
| 2010/0321899 A1* | 12/2010 | Vossoughi | .............. | B60R 11/02 361/728 |
| 2011/0187660 A1* | 8/2011 | Hirata | ................. | G06F 3/03547 345/173 |

FOREIGN PATENT DOCUMENTS

| | | |
|---|---|---|
| JP | 2009-094574 A | 4/2009 |
| JP | 2009-111581 A | 5/2009 |
| WO | WO 2010/007813 A1 | 1/2010 |

OTHER PUBLICATIONS

Extended European Search Report dated Jul. 6, 2015 in Patent Application No. 12860989.8.
Office Action dated Aug. 4, 2015 in Japanese Patent Application No. 2011-276679.
Combined Chinese Office Action and Search Report dated Nov. 23, 2016 in Patent Application No. 201280061153.6 (with English Translation).

\* cited by examiner

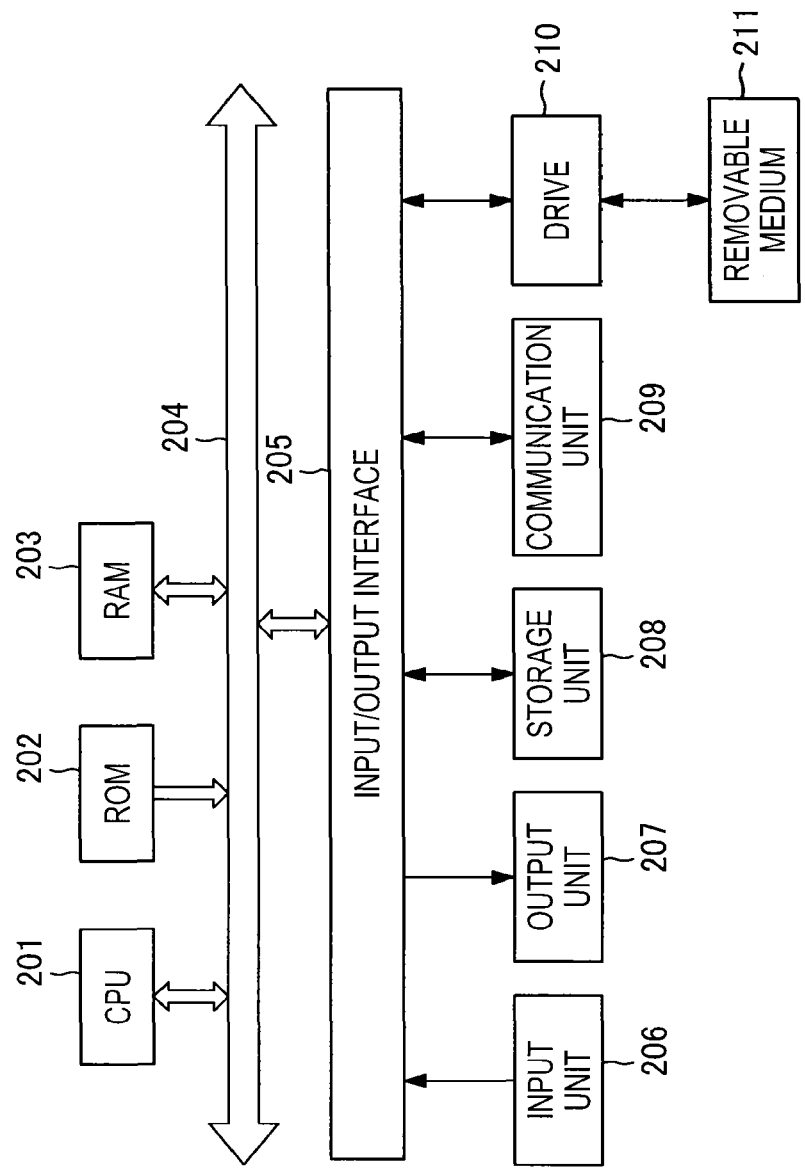

PORTABLE DEVICE, INFORMATION PROCESSING METHOD, AND PROGRAM

CROSS-REFERENCE TO RELATED APPLICATIONS

This application is a continuation of and claims the benefit of priority under 35 U.S.C. § 120 from U.S. Ser. No. 14/356,277 filed May 5, 2014, the entire contents of which are incorporated herein by reference. U.S. Ser. No. 14/356,277 is a National Stage of PCT Application No. PCT/JP12/081754 filed Dec. 7, 2012, which was published under PCT Article 21(2) in Japanese.

TECHNICAL FIELD

The present technology relates to portable devices, information processing methods, and programs, and more particularly, to a portable device, an information processing method, and a program which allow a photographed image to be easily shared with a particular person.

BACKGROUND ART

In recent years, a portable device having photographing and communication functions, such as a so-called smartphone or a digital still camera with a communication function, has come into wide use.

An example of applications using photographing and communication functions may include an application that uploads a photographed image to a server and is open to other users such as a friend. Using such an application makes it possible for a user to share an image photographed by the user with other users.

CITATION LIST

Patent Literature

Patent Literature 1: JP 2009-504098T

Non-Patent Literature

SUMMARY OF INVENTION

Technical Problem

When an image is intended to be shared as described above, it is necessary for the user to perform operations including photographing an image, activating browser to have access to a predetermined server, logging in, for example, by entering a password assigned in advance, and then selecting an image among images obtained by photographing, and uploading the image.

Such operations will become complicated, especially when they are performed in a device with a compact casing, which is equipped only with a small-sized display or small buttons.

The present technology is made in view of such circumstances as described above, and it is desirable for a photographed image to be easily shared with a particular person.

Solution to Problem

According to an embodiment of the present technology, there is provided a portable device including a photographing unit, a communication unit configured to transmit an image obtained through photographing by the photographing unit to another portable device managed in association with the portable device each time when photographing is performed, and configured to receive the image transmitted from the other portable device each time when photographing is performed in the other portable device, and a display unit configured to display the image transmitted from the other portable device and received by the communication unit.

The portable device may further include a storage unit configured to store the image obtained through photographing by the photographing unit and the image received by the communication unit, and a display control unit configured to select a predetermined image from among the images stored in the storage unit and to cause the display unit to display the selected image.

The display unit may be provided in a front of a casing of the portable device. The photographing unit may be provided in a rear of the casing. The portable device may further include a detection unit configured to detect whether a user touches any opposed sides of top and bottom sides and left and right sides of the casing and whether a depression operation of opposed sides by the user is performed.

The display control unit may cause the image received last by the communication unit to be displayed depending on a fact that it is detected that a user touches a side of the casing.

The photographing unit, when it is detected that the user touches one set of sides of top and bottom sides and left and right sides, may perform photographing depending on a fact that the user perform a depression operation on the set of sides.

The portable device may further include a displacement detection unit configured to detect a change in a position applied to the casing.

The display control unit, when it is detected that the user touches the other set of sides, may switch the image to be displayed on the display unit depending on detection of a change in position upon performing a depression operation on the other set of sides.

The communication unit may transmit identification information of the image displayed by switching to the other portable device. The image identified by the identification information may be displayed in the other portable device.

The display unit may be configured by a self-emitting and light-transmissive type display. The display control unit may cause one piece of the image to be displayed on an area which is provided with a light-shielding member in a rear side of an entire display area of the display unit, and causes a portion of another image to be displayed on an area which is not provided with the light-shielding member in a rear side of the entire display area of the display unit.

The display control unit, when it is detected that the user touches the one set of sides or the other set of sides, may change a state of the image to be displayed on the display unit depending on detection of the change in position.

The communication unit may transmit identification information of the image displayed on the display unit and information regarding the detected change in position to the other portable device. In the other portable device, the image identified by the identification information may be displayed, and a process for changing a state depending on the information regarding the change in position may be performed.

The display unit may be configured by a self-emitting and light-transmissive type display. The display control unit may move a display position of one piece of the image displayed on an area which is provided with a light-shielding member in a rear side of an entire display area of the display unit, the display position being moved within a range of the display area.

The display unit may be configured by a self-emitting and light-transmissive type display. Display control unit may cause one piece of the image to be displayed on an area which is provided with a light-shielding member in a rear side of an entire display area of the display unit, and causes an icon to be displayed on an area which is not provided with the light-shielding member on a rear side of the entire display area of the display unit.

The communication unit may be connected to both the portable device and the other portable device via a network, transmits the image obtained by photographing to the other portable device via a management device, and receives the image transmitted from the other portable device, the management device being used to manage the portable device and the other portable device in association with each other.

The network means a mechanism configured to allow at least two devices to be connected to each other and enable information to be transmitted from one device to another. Communication over the network may be performed between separate devices or may be performed between internal blocks that make up one device.

In another embodiment of the present technology, photographing is performed, and an image obtained through photographing by a portable device is transmitted to another portable device managed in association with the portable device each time when photographing is performed. In addition, the image transmitted from the other portable device each time when photographing is performed in the other portable device is received and then displayed.

Advantageous Effects of Invention

According to the present technology, it is possible for a photographed image to be easily shared with a particular person.

BRIEF DESCRIPTION OF DRAWINGS

FIG. 25 is a block diagram illustrating an exemplary configuration of a computer.

DESCRIPTION OF EMBODIMENTS

<External Configuration of Portable Device>

Figure 1:
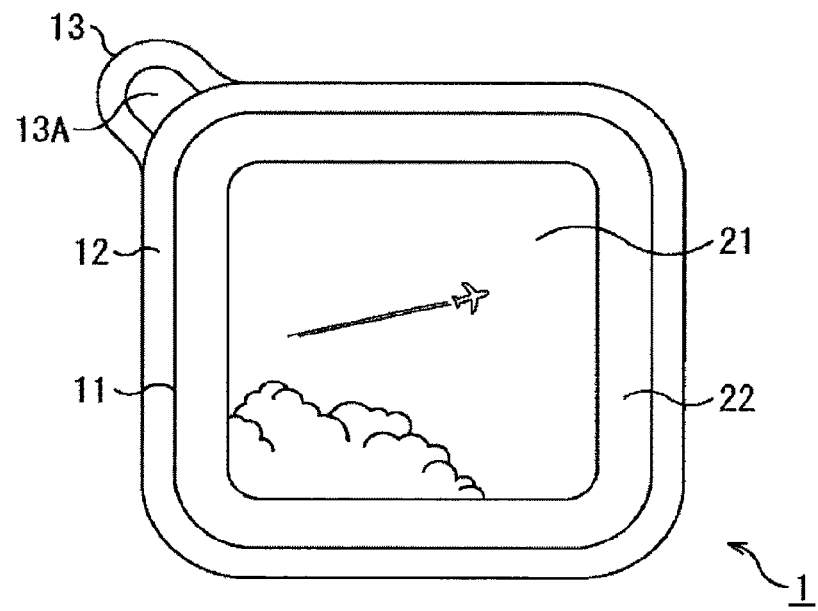
FIG. 1 is a diagram illustrating an exemplary configuration of the front of a portable device according to an embodiment of the present technology.

FIG. 1 is a diagram illustrating an exemplary configuration of the front of a portable device according to an embodiment of the present technology.

As shown in FIG. 1, the front of the portable device 1 is shaped to be substantially square with rounded corners. The portable device 1 is basically configured to include a display 11 and a frame 12 that is provided to serve as an edge member to surround the display 11.

As described later, the portable device 1 incorporates an acceleration sensor, and the direction of the portable device 1 is determined based on the detection result obtained by the acceleration sensor, and thus the top, bottom, left, and right sides thereof are specified. In other words, any one of the bottom side, left side, and right side shown in FIG. 1 may be the top side depending on the direction in which the user holds the portable device 1. In the following, the description will be given with reference to the direction shown in FIG. 1.

A U-shaped holder 13 is provided in a curved surface portion that connects the top and the left sides at the top left of the frame 12. The holder 13 allows the user to carry the portable device 1 with a strap or the like passing through a hole 13A formed in the holder 13 for hanging the portable device 1 around the user's neck or for connecting the portable device 1 to a portable phone or the like.

The portable device 1 has a size capable of holding a casing by pinching opposite sides of the top and bottom sides or left and right sides formed by the frame 12 with two fingers of one hand such as the thumb and index fingers. The user can pinch the casing of the portable device 1 with the user's one hand to view display on the display 11 while holding it.

The display 11 is, for example, a self-emitting display such as an organic EL display or the like and a light-transmissive type display. The entire display area of the display 11 includes an area 21 and an area 22. The area 21 is the non-light transmissive area having a light-shielding member provided on the rear side of the portable device. The area 22 formed to surround the area 21 is the transmissive area which is not provided with a light-shielding member on the rear side thereof.

The area 21 displays, for example, one image that is photographed. In the area 21, the light-shielding member is provided on the rear side, and thus the image of the area 21 is displayed with high contrast. On the other hand, an image such as an icon displayed in the area 22 is displayed to allow the user to view the image in a manner superimposed on a landscape on the rear side of the portable device 1.

Figure 2:
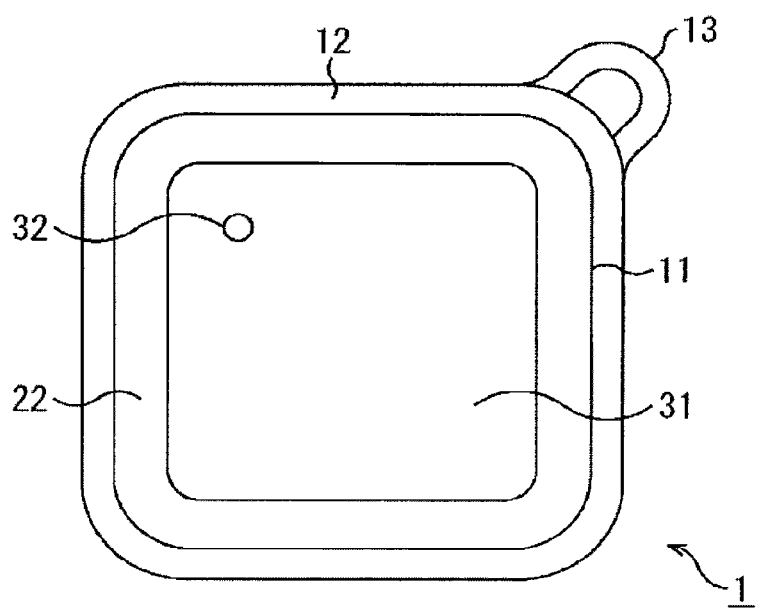
FIG. 2 is a diagram illustrating an exemplary configuration of the rear of the portable device.

FIG. 2 is a diagram illustrating an exemplary configuration of the rear of the portable device 1.

The display 11 has a light-shielding member 31 attached approximately in the center of the display 11. The light-shielding member 31 is provided inside thereof with an electrical configuration such as a circuit that controls display on the display 11 or a battery.

The light-shielding member 31 is provided with a camera 32 at a predetermined position thereof. That is, the portable device 1 has a function as a camera and a function as a photo frame that displays a photographed image. The casing of the portable device 1 may have a relatively small size and thus the user can take a photograph or view an image while the user carries the portable device 1 without difficulty.

Figure 3:
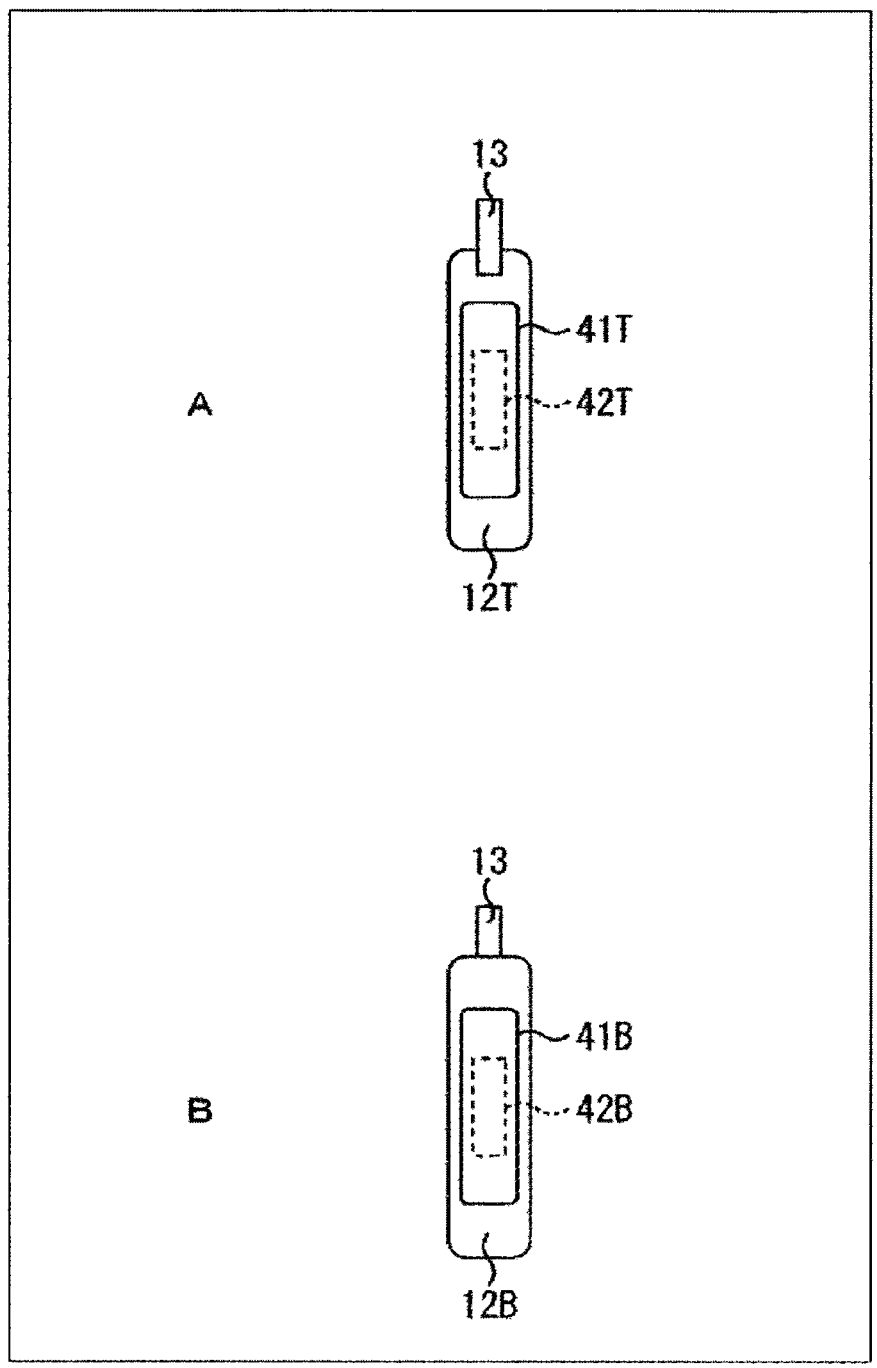
FIG. 3 is a diagram illustrating an exemplary configuration of a side of the portable device.

In FIG. 3, A is a diagram illustrating the top side of the portable device 1, and B is a diagram illustrating the bottom side of the portable device 1. In A of FIG. 3, the left side is the front side of the portable device 1 and the right side is the rear side of the portable device 1. On the other hand, in B of FIG. 3, the right side is the front side of the portable device 1 and the left side is the rear side of the portable device 1.

Figure 4:
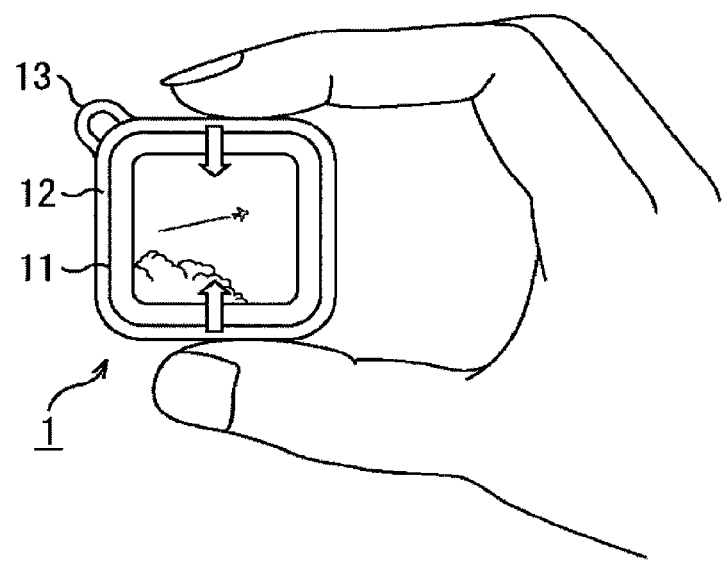
FIG. 4 is a diagram illustrating an example of a way to hold the portable device.

As illustrated in A and B of FIG. 3, the casing of the portable device 1 has a predetermined thickness. A touch sensor 41T is provided in the top side 12T, and a touch sensor 41B is provided in the bottom side 12B. As illustrated in FIG. 4, when the user holds the portable device 1 by pinching the top side 12T and the bottom side 12B with two fingers, this is detected by the touch sensors 41T and 41B.

As indicated by the broken line in A of FIG. 3, a switch 42T is provided under the touch sensor 41T (inside the casing). In addition, as indicated by the broken line in B of FIG. 3, a switch 42B is provided under the touch sensor 41B. The user can perform a depression operation of the switches 42T and 42B by applying a force to the inside direction of the portable device 1 as indicated by the white arrow from the state of FIG. 4 in which the user holds the portable device 1 by pinching the top side 12T and the bottom side 12B with two fingers.

Figure 5:
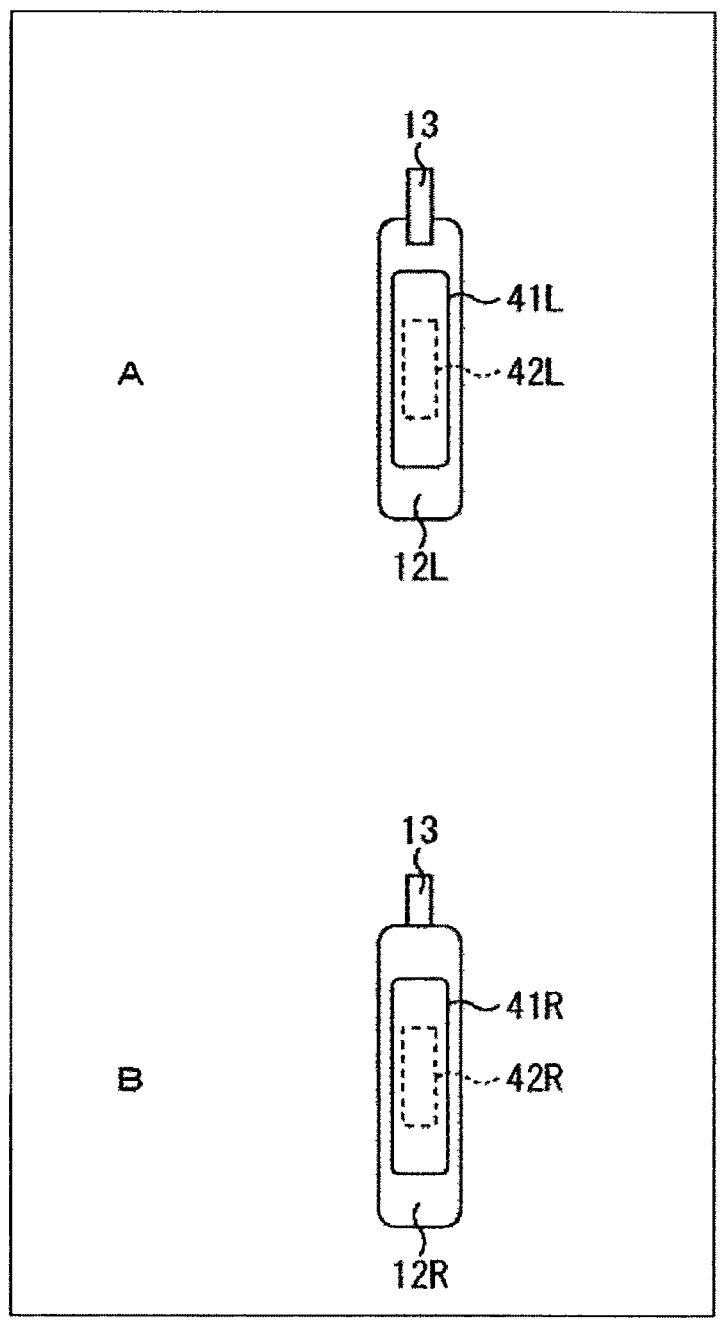
FIG. 5 is a diagram illustrating the other side of the portable device.

In FIG. 5, A is a diagram illustrating the left side of the portable device 1, and B is a diagram illustrating the right side of the portable device 1. In A of FIG. 5, the right side is the front side of the portable device 1 and the left side is the rear side of the portable device 1. On the other hand, in B of FIG. 5, the left side is the front side of the portable device 1 and the right side is the rear side of the portable device 1.

Figure 6:
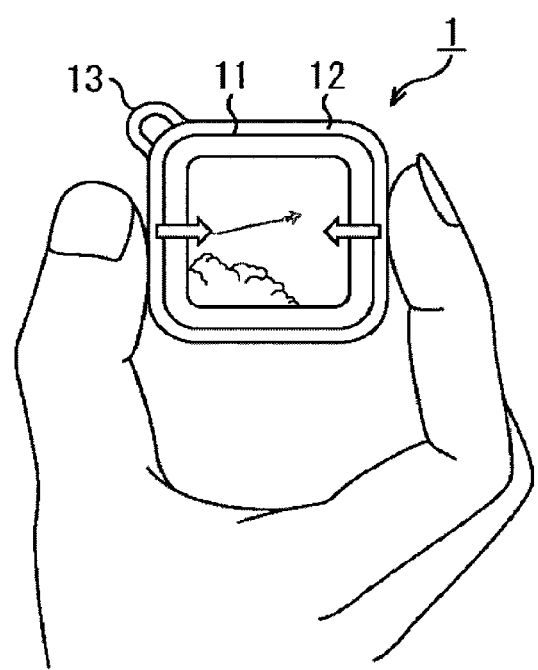
FIG. 6 is a diagram illustrating another example of a way to hold the portable device.

A touch sensor 41L is provided in the left side 12L, and a touch sensor 41R is provided in the right side 12R. As illustrated in FIG. 6, when the user holds the portable device 1 by pinching the left side 12L and the right side 12R with two fingers, this is detected by the touch sensors 41L and 41R.

As indicated by the broken lines in A and B of FIG. 5, a switch 42L is provided under the touch sensor 41L, and a switch 42R is provided under the touch sensor 41R. The user can perform a depression operation of the switches 42L and 42R by applying a force to the inside direction of the portable device 1 as indicated by the white arrow from the state of FIG. 6 in which the user holds the portable device 1 by pinching the left side 12L and the right side 12R with two fingers.

Hereinafter, as appropriate, the touch sensors 41T, 41B, 41L, and 41R are collectively referred to as a touch sensor 41 if it is not necessary to distinguish between individuals. In addition, the switches 42T, 42B, 42L, and 42R are collectively referred to as a switch 42 if it is not necessary to distinguish between individuals.

The photographing function and image viewing function that use the portable device 1 may be switched by the way of holding the portable device 1 as shown in FIGS. 4 and 6 or in response to the operation of the switch 42.

The portable device 1 is also equipped with a wireless communication function by a wireless LAN (Local Area Network) or the like. The portable device 1 can transmit a photographed image to another portable device, and receive an image which is photographed by the other portable device and transmitted from the other portable device for displaying.

<Configuration of Information Processing System>

Figure 7:
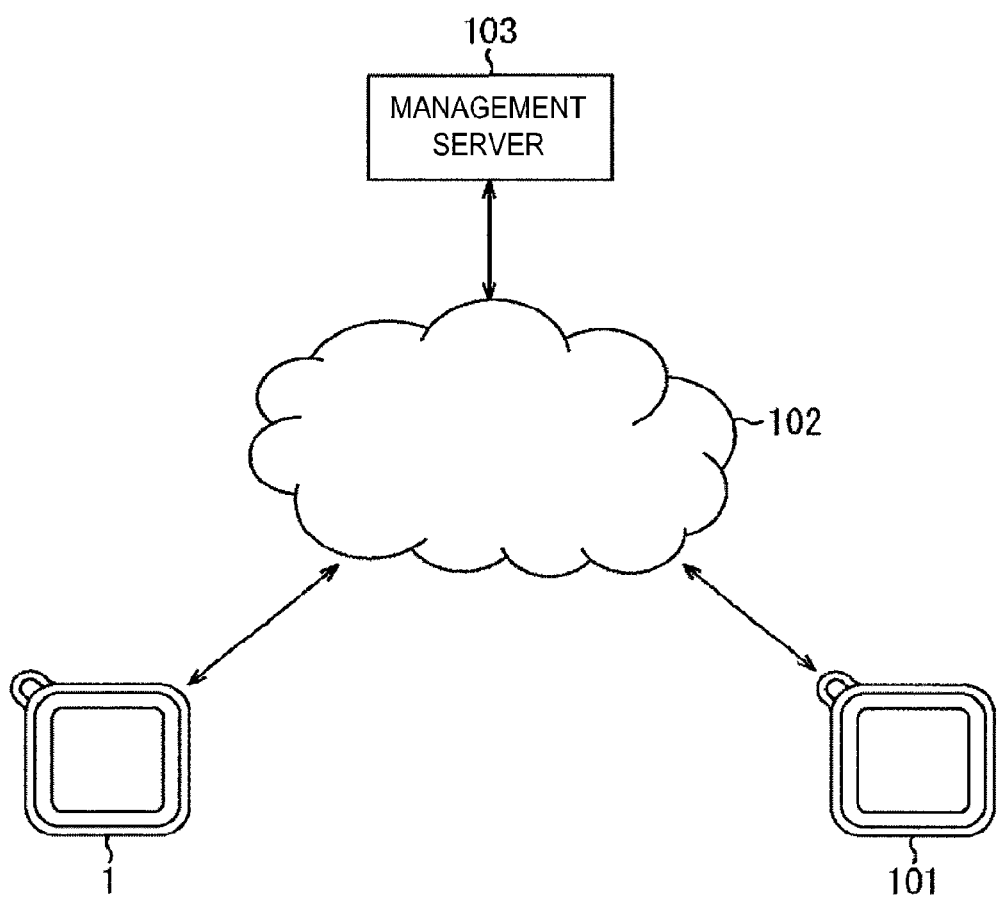
FIG. 7 is a diagram illustrating an exemplary configuration of an information processing system.

FIG. 7 is a diagram illustrating an exemplary configuration of an information processing system.

The information processing system of FIG. 7 is configured to include the portable device 1 and a portable device 101 which are connected to each other via the Internet 102. The portable device 101 has the same configuration and function as those of the portable device 1, and the portable device 101 is a device carried by the user different from the user of the portable device 1.

The Internet 102 is also connected to a management server 103. The management server 103 manages the portable device 1 and the portable device 101 in association with each other. For example, the management server 103 manages the portable device 1 and the portable device 101 in association with each other by storing identification information such as an IP address of the portable device 1 in association with identification information of the portable device 101.

The portable device 1 and the portable device 101 are sold, for example, in sets. The association of the portable device 1 with the portable device 101 is performed prior to sale, and identification information of each of the portable device 1 and the portable device 101 is stored previously in the management server 103. Although not shown, any pair of portable devices other than the pair of the portable device 1 and the portable device 101 may be managed in association with each other in the management server 103.

In the information processing system having such a configuration, for example, when photographing is performed using the portable device 1 by the user of the portable device 1, an image obtained by photographing is transmitted (uploaded) from the portable device 1 to the management server 103. The transmission of an image from the portable device 1 to the management server 103 is performed automatically each time photographing of an image is performed, for example, without relying on the user's operation.

The management server 103 that receives the image transmitted from the portable device 1 specifies that a device managed in association with the portable device 1 that is a transmission source device of the image is the portable device 101, based on the identification information stored therein. In addition, the management server 103 regards the specified portable device 101 as a transmission destination and transmits the image transmitted from the portable device 1 to the specified portable device 101.

The portable device 101 receives the image transmitted from the management server 103 and displays the received image. The user of the portable device 101 can view the image which is photographed by the user of the portable device 1 and transmitted from the portable device 1.

Thus, the user of the portable device 1 can share an image with the user of the portable device 101 each time when photographing is performed, and can communicate his intention by allowing an object viewed and photographed by the user of the portable device 1 to be viewed to the user of the portable device 101.

Furthermore, the user of the portable device 1 is not necessary to have access to a site managed by the management server 103 or to enter a password to login, and this allows the user of the portable device 1 to share an image with ease. Assuming that it is necessary to perform various types of operations to share an image, especially when a small device is used, the operations will become complicated because buttons are small or a display is small, but such complicated operations are not required to be performed by the user.

On the other hand, when the user of the portable device 101 takes a photograph using the portable device 101, an image obtained by photographing is transmitted from the portable device 101 to the management server 103.

The management server 103 that receives the image transmitted from the portable device 101 specifies that a device managed in association with the portable device 101 that is a transmission source device of the image is the portable device 1, based on the identification information stored therein. In addition, the management server 103 regards the specified portable device 1 as a transmission destination and transmits the image transmitted from the portable device 101 to the specified portable device 1.

The portable device 1 receives the image transmitted from the management server 103 and displays the received image. The user of the portable device 1 can view the image which is photographed by the user of the portable device 101 and transmitted from the portable device 101.

The user of the portable device 101 can also similarly share an image with the user of the portable device 1 each time when photographing is performed, and can communicate the intention.

In this way, between the user of the portable device 1 and the user of the portable device 101, communication using an image photographed by the user oneself, that is, sensuous communication is implemented, rather than direct communication in which the intention is conveyed using a text, voice, or the like.

The configuration and function of the portable device 1 will be mainly described below, but the portable device 101 also has the same configuration and function as those of the portable device 1. Thus, the following description of the configuration of the portable device 101 is quoted from that of the portable device 1 as appropriate.

<Operation Mode of Portable Device>

Figure 8:
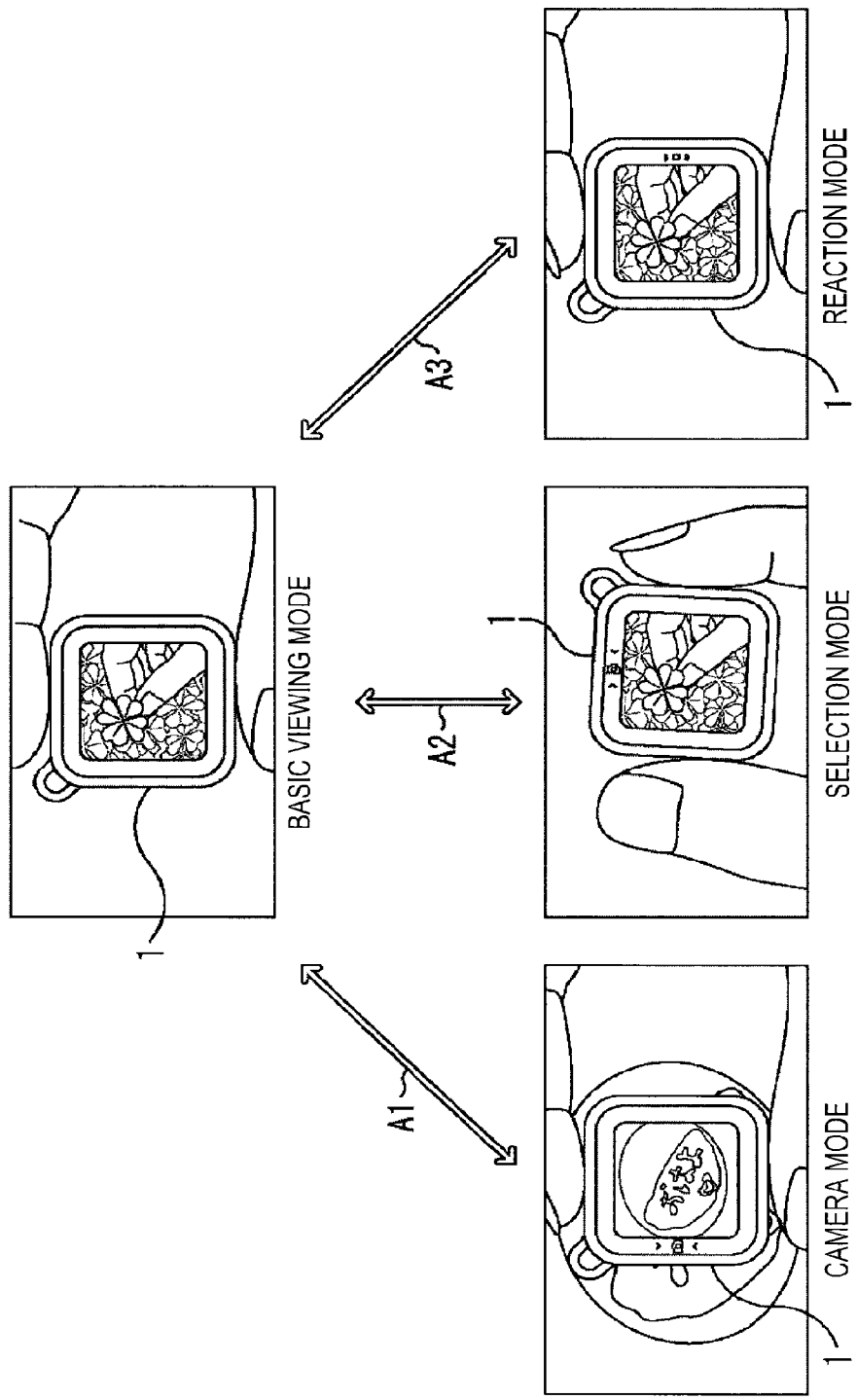
FIG. 8 is a diagram illustrating an example of an operation mode of the portable device.

FIG. 8 is a diagram illustrating an example of an operation mode of the portable device 1.

The operation mode of the portable device 1 includes a basic viewing mode, a camera mode, a selection mode, and a reaction mode, in addition to a standby mode in which a display state of the display 11 is turned off.

As will be described in detail later, the basic viewing mode is a mode for viewing an image or the like transmitted from the other party (the user of the portable device 101). The camera mode is a mode for performing photographing and transmitting an image obtained by photographing to the other party. The selection mode is a mode for selecting a predetermined image from among images photographed by a user oneself or transmitted from the other party. The reaction mode is a mode for returning reaction to the other party who has transmitted an image.

As indicated by the arrows A1 to A3, the transition from the basic viewing mode to each operation mode of the camera mode, the selection mode, and the reaction mode is possible. In addition, the transition from each operation mode of the camera mode, the selection mode, and the reaction mode to the basic viewing mode is possible.

[Basic Viewing Mode]

Figure 9:
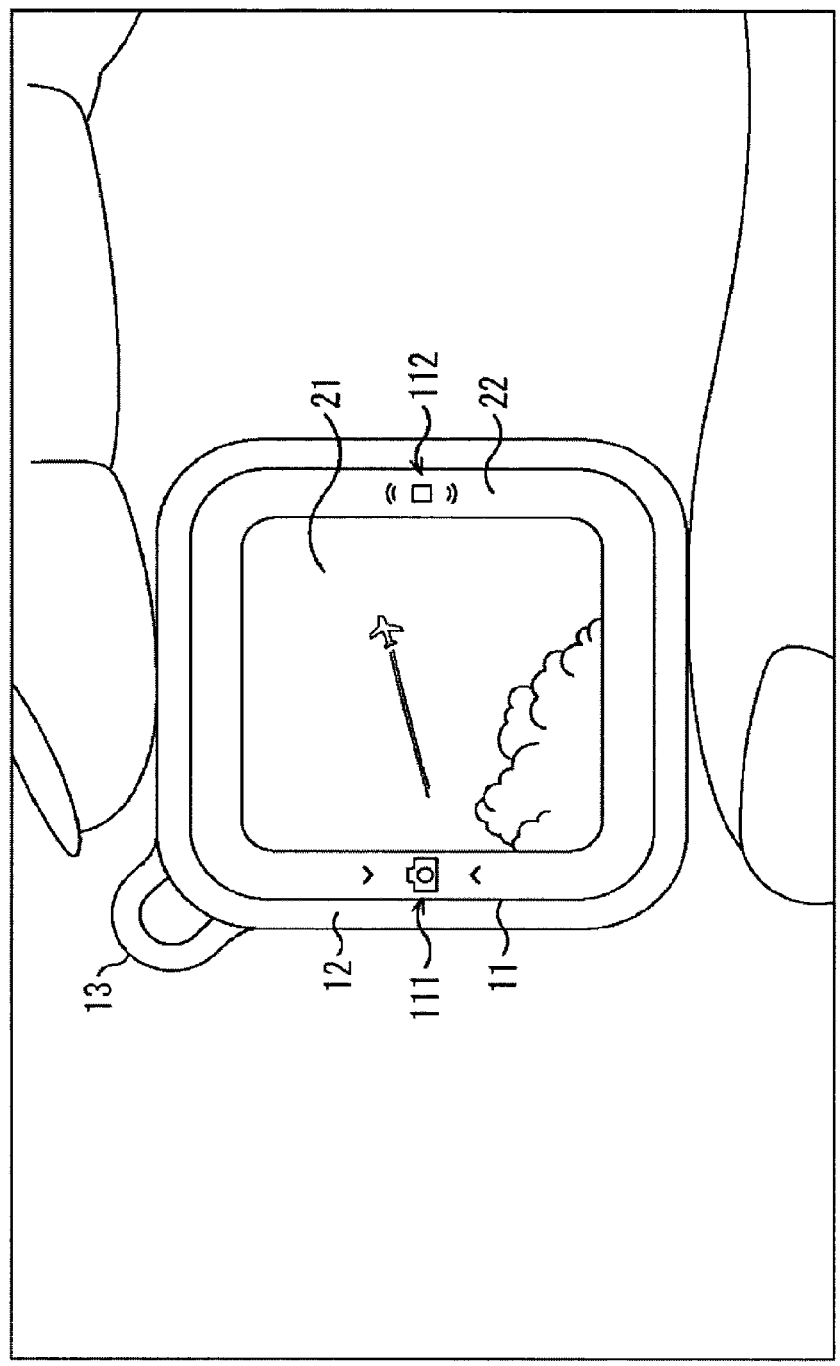
FIG. 9 is a diagram illustrating an example of display of a display in a basic viewing mode.

FIG. 9 is a diagram illustrating an example of display on the display 11 in the basic viewing mode.

The basic viewing mode is set, for example, in response to the fact that the touch sensor 41 detects that the casing is touched at the time of the standby mode.

When the basic viewing mode is set, a display state of the display 11 is turned on, and a synchronous image that is an image synchronized with the portable device 101 is displayed in the area 21. If there is more than one synchronous image, for example, a synchronous image that is last synchronized is displayed.

In the portable device 1, a synchronous image may be an image photographed in the camera mode, an image selected in the selection mode, or an image to which reaction is attached in the reaction mode. As will be described later, any of these images is displayed on the display 11 of the portable device 1 and is also displayed on the display 11 of the portable device 101.

Furthermore, in the portable device 101, an image photographed in the camera mode, an image selected in the selection mode, or an image to which reaction is attached in the reaction mode may also be a synchronous image. Any of these images is displayed on the display 11 of the portable device 101 in response to photographing or the like in the portable device 101, and is also displayed on the display 11 of the portable device 1.

The basic viewing mode is set when the user touches any of top, bottom, left, and right sides. The user can view an image even if the portable device 1 is held in either direction.

When the user holds the portable device 1 by pinching the top and bottom sides thereof as shown in FIG. 9, a camera icon 111 is displayed in a position on the left side of the area 21 among positions of the area 22 that is a light-transmissive area. The camera icon 111 is composed of a camera image and an arrow image sandwiching the camera from above and below. The camera icon 111 indicates that it is possible to make a transition to the camera mode by pressing simultaneously the switch 42T on the top side and the switch 42B on the bottom side.

Moreover, a reaction icon 112 is displayed in a position on the right side of the area 21. The reaction icon 112 is composed of a square-shaped image and an image indicating vibration, which is positioned in the upper and lower sides of the square-shaped image. The reaction icon 112 indicates that it is possible to make a transition to the reaction mode by shaking the casing up and down. Whether the casing is shaken up and down by the user is specified, for example, based on a detection result obtained by an acceleration sensor incorporated into the portable device 1.

In this way, when the portable device 1 is held by pinching the top side and the bottom side, the display 11 displays the icon in the left and right sides of an image.

Figure 10:
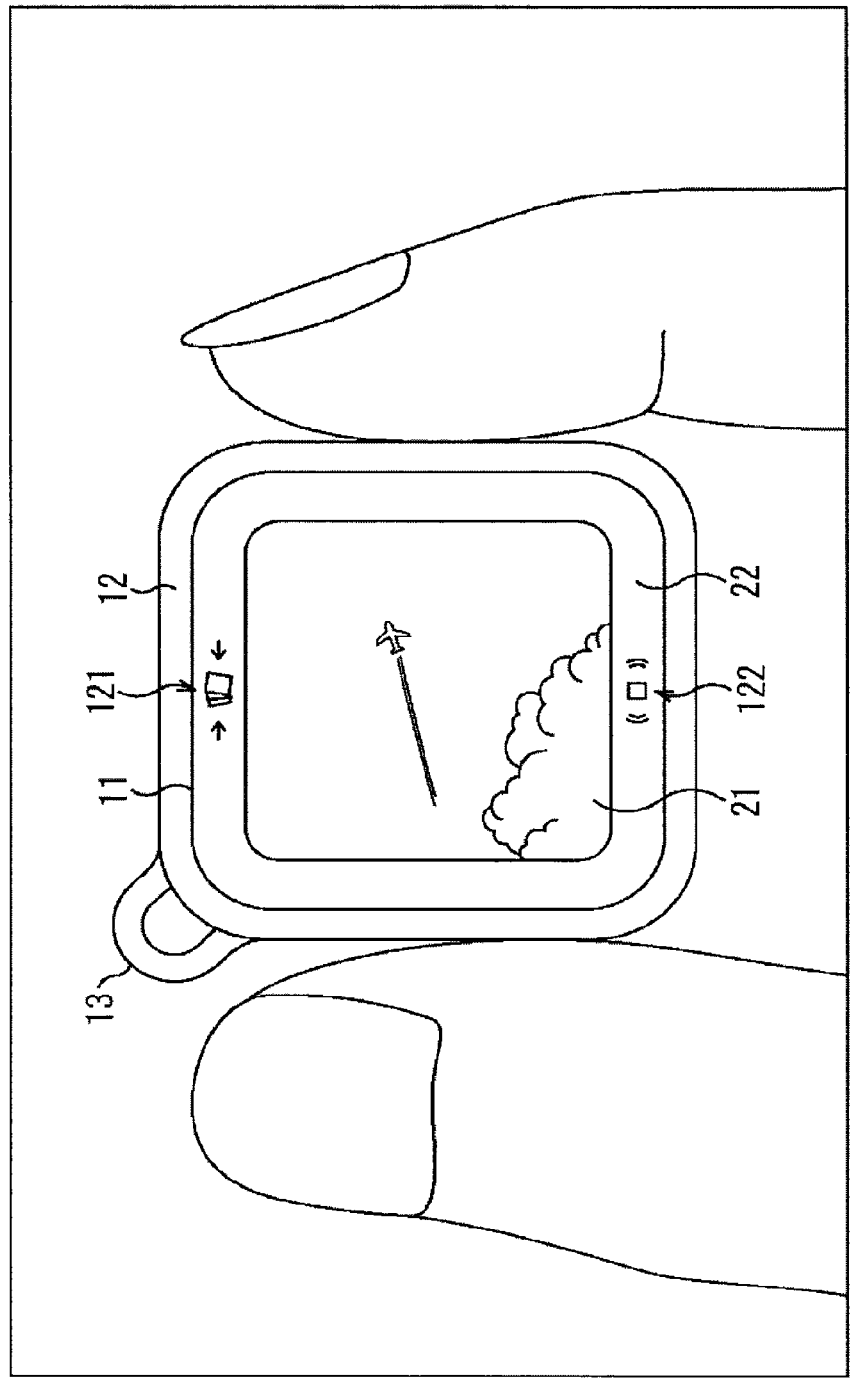
FIG. 10 is a diagram illustrating another example of display of the display in a basic viewing mode.

FIG. 10 is a diagram illustrating another example of display on the display 11 in the basic viewing mode.

When the user holds the portable device 1 by pinching the left and right sides thereof as shown in FIG. 10, a selection icon 121 is displayed in a position above the area 21 among positions of the area 22 that is a light-transmissive region. The selection icon 121 is composed of an image in which three squares are overlapped one another and an arrow image which sandwiches the three squares from the right and left sides. The selection icon 121 indicates that it is possible to make a transition to the selection mode by pressing simultaneously the switch 42L on the left side and the switch 42R on the right side.

Moreover, a reaction icon 122 is displayed in a position under the area 21. The reaction icon 122 is arranged in the horizontal direction which is different from the arrangement direction of the reaction icon 112 in FIG. 9. The reaction icon 122 indicates that it is possible to make a transition to the reaction mode by shaking the casing from side to side.

In this way, when the portable device 1 is held by pinching the left and right sides thereof, the icon is displayed in the upper and lower sides of an image on the display 11.

[Camera Mode]

Figure 11:
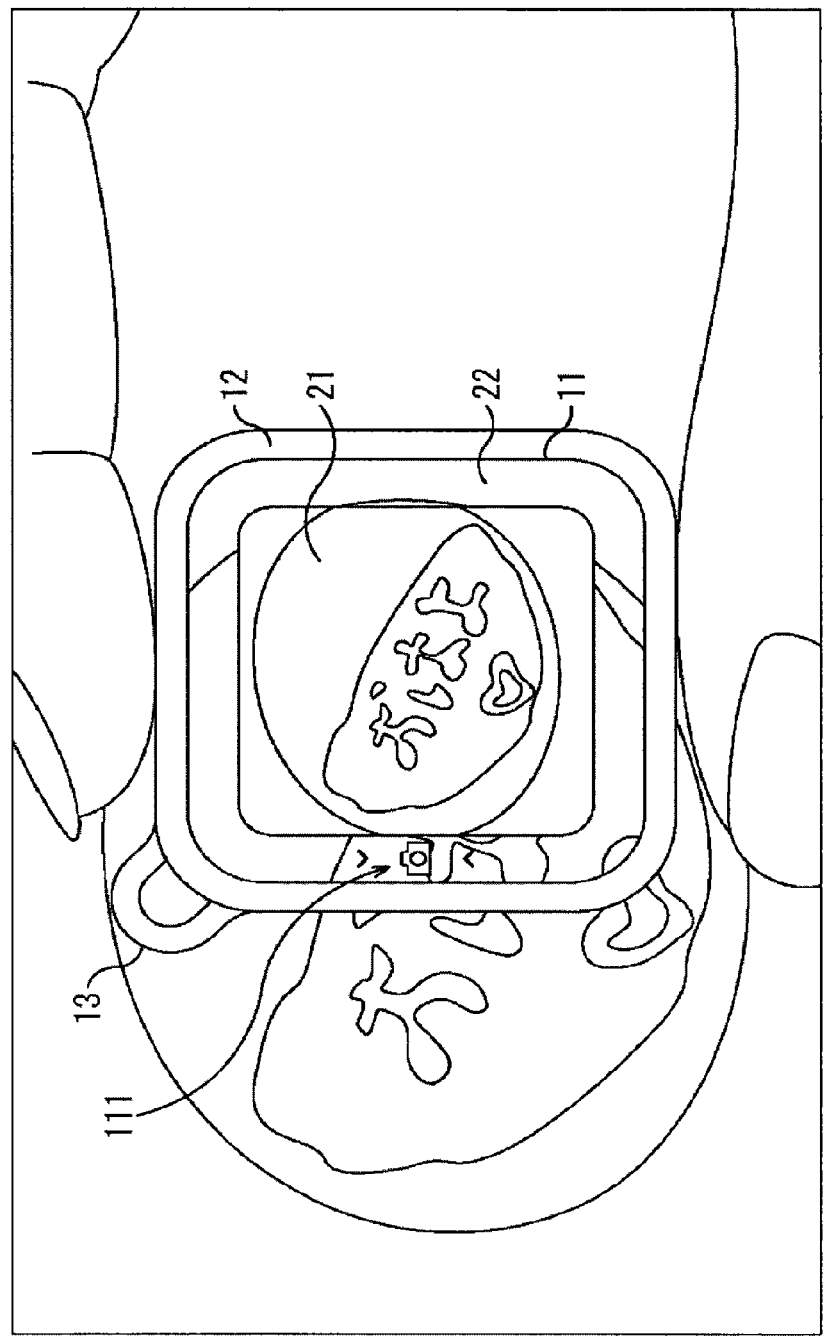
FIG. 11 is a diagram illustrating an example of display of the display in a camera mode.

FIG. 11 is a diagram illustrating an example of display on the display 11 in the camera mode.

The camera mode is set when it is detected that the switch 42T on the top side and the switch 42B on the bottom side are simultaneously pressed in a case where the basic viewing mode is set. The user can make a transition to the basic viewing mode by pinching the top and bottom sides together to hold the casing at the time of the standby mode, and then, from this state, the user can make a transition to the camera mode by pressing the top and bottom sides simultaneously. The camera mode may be set by pressing any one of the switch 42T on the top side and the switch 42B on the bottom side rather than pressing both switches simultaneously.

When the camera mode is set, a live view image captured by the camera 32 is displayed in the area 21 of the display 11. The user can determine a photographing composition while viewing the image displayed in the area 21.

The camera icon 111 is displayed in the left side of the area 21. The camera icon 111 of FIG. 11 indicates that it is possible to perform photographing by pressing simultaneously the switch 42T on the top side and the switch 42B on the bottom side. In addition, the reaction icon 112 of FIG. 9, which has been displayed in the right side of the area 21 in the basic viewing mode before the camera mode is set, disappears upon setting of the camera mode.

When the switch 42T on the top side and the switch 42B on the bottom side are pressed simultaneously and photographing is performed, an image obtained by photographing is regarded as a synchronous image, and this image is stored in a memory provided in the portable device 1 and is transmitted to the portable device 101. When the portable device 101 receives the image transmitted from the portable device 1 and the basic viewing mode is set, the image photographed by the user of the portable device 1 is displayed in the portable device 101.

[Selection Mode]

Figure 12:
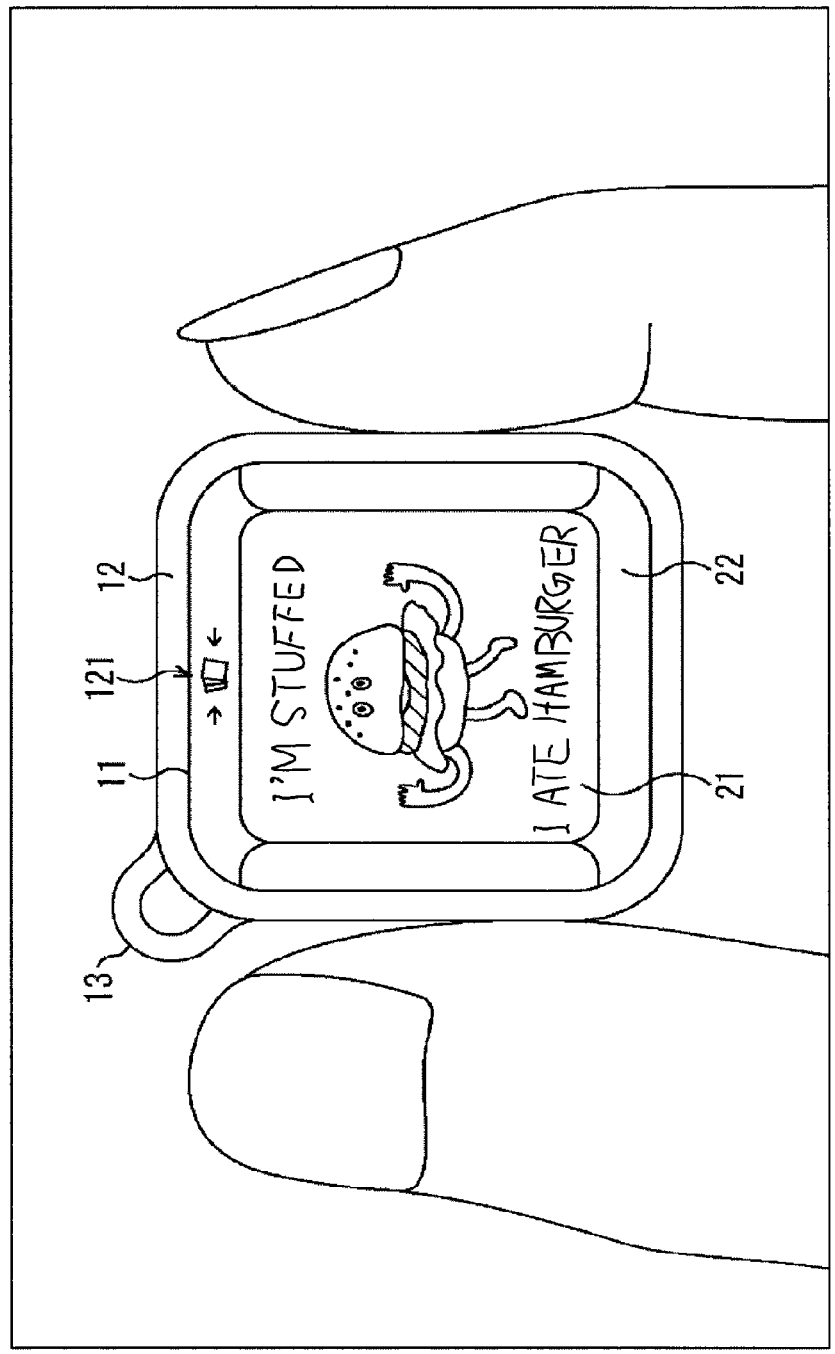
FIG. 12 is a diagram illustrating an example of display of the display in a selection mode.

FIG. 12 is a diagram illustrating an example of display on the display 11 in the selection mode.

The selection mode is set when it is detected that the switch 42L on the left side and the switch 42R on the right side are simultaneously pressed in a case where the basic viewing mode is set. The user can make a transition to the basic viewing mode by pinching the left and right sides together to hold the casing at the time of the standby mode, and then, from this state, the user can make a transition to the selection mode by pressing the left side and the right side simultaneously. The selection mode may be set by pressing any one of the switch 42L on the left side and the switch 42R on the right side rather than pressing both switches simultaneously.

When the selection mode is set, a predetermined image of an image photographed by the camera 32 and an image transmitted from the portable device 101 is read from the memory and is displayed in the area 21 of the display 11. A portion of another image that is read from the memory is displayed in the left and right sides of the area 21.

The selection icon 121 is displayed above the area 21. The selection icon 121 of FIG. 12 indicates that it is possible to switch an image in the area 21 by tilting the casing to the left or right direction while the switch 42L on the left side and the switch 42R on the right side are being pressed. In addition, the reaction icon 122 of FIG. 10, which has been displayed under the area 21 in the basic viewing mode before the selection mode is set, disappears in response to setting of the selection mode.

When the casing is tilted while the switch 42L on the left side and the switch 42R on the right side are being pressed, an image of the area 21 is switched to another image depending on the direction in which the casing is tilted.

Figure 13:
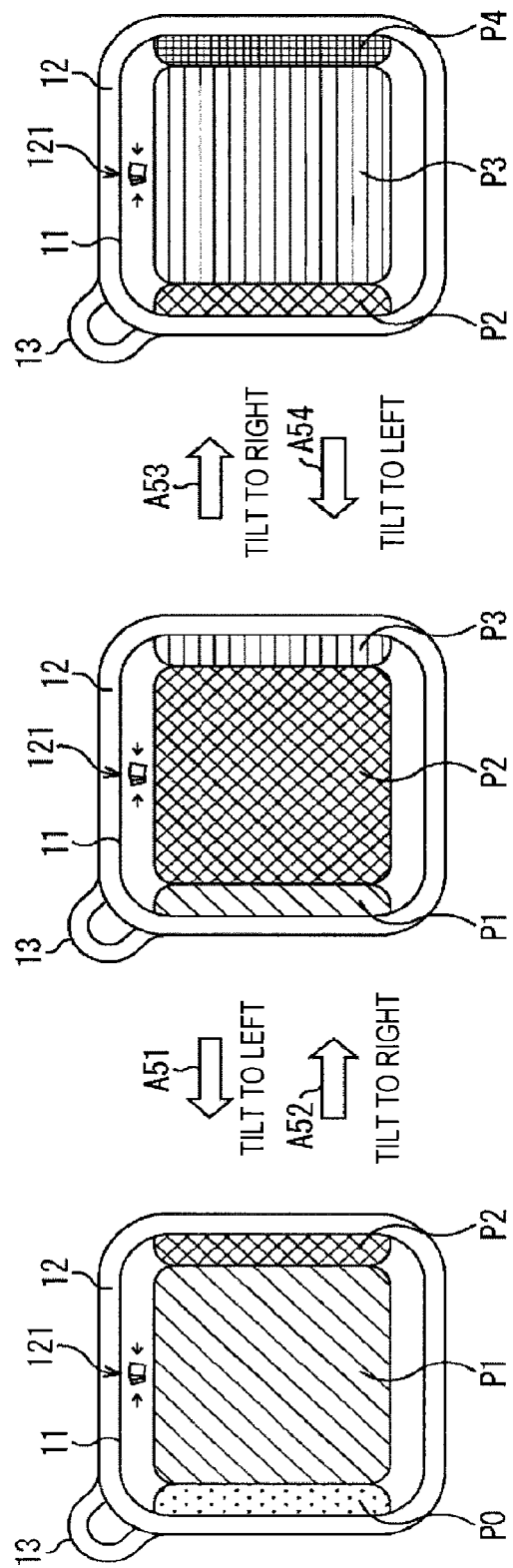
FIG. 13 is a diagram illustrating an example of switching of an image.

FIG. 13 is a diagram illustrating an example of switching of an image.

Here, the description will be given by regarding a state in which an image P2 is displayed in the area 21, a portion of the right part of an image P1 is displayed in the left side of the area 21, and a portion of the left part of an image P3 is displayed in the right side of the area 21 as shown in the middle of FIG. 13, as a reference state. The images P1 and P3 are images displayed in the area 22 that is a light-transmissive area, and thus the images P1 and P3 appear to be more transparent than the image P1 displayed in the area 21. The images P1 to P3 are images which are photographed by the portable device 1 and stored in the memory or images which are transmitted from the portable device 101 and stored in the memory after they are received. Arrangement sequence of these images P1 to P3 is set, for example, according to photographing order.

In the reference state, when the casing is tilted to the left while the switch 42L on the left side and the switch 42R on the right side are being pressed, as shown by the point of the white arrow A51, the image P1 that is adjacent to the image P2 on the left is displayed in the area 21. In addition, the position of another image is also moved in conjunction with the display switching in the area 21. A portion of the right part of an image P0 that is the previous image of the image P1 in order of photographing is displayed in the left side of the image P1 displayed in the area 21, and a portion of the left part of the image P2 is displayed in the right side of the image P1.

In the state shown in the left of FIG. 13, when the casing is tilted to the right while the switch 42L on the left side and the switch 42R on the right side are being pressed, as shown by the point of the white arrow A52, a display state of the display 11 is returned to the reference state.

On the contrary, in the reference state, when the casing is tilted to the right while the switch 42L on the left side and the switch 42R on the right side are being pressed, as shown by the point of the white arrow A53, the image P3 that is adjacent to the image P2 on the right is displayed in the area 21. In addition, a portion of the right part of an image P2 is displayed in the left side of the image P3 displayed in the area 21, and a portion of the left part of an image P4 that is the subsequent image of the image P3 in order of photographing is displayed in the right side of the image P3.

In the state shown in the right of FIG. 13, when the casing is tilted to the left while the switch 42L on the left side and the switch 42R on the right side are being pressed, as shown by the point of the white arrow A54, the display state of the display 11 is returned to the reference state.

In this way, in the selection mode, the user can switch the display on the area 21 sequentially and can look back on the exchange of an image with the other party. In addition, a portion of an image is displayed in the area 22, and thus the user can intuitively recognize existence of an image other than the image displayed in the area 21.

For example, when the condition in which the switch 42L on the left side and the switch 42R on the right side are pressed is released, an image displayed in the area 21 at that time is selected as a synchronous image, and identification information such as a file name of the selected image is transmitted to the portable device 101. A way of selecting an image is not limited to the operation of releasing the fingers from the switch 42L on the left side and the switch 42R on the right side, and other operations may be employed.

In the portable device 101, when the portable device 101 receives the file name transmitted from the portable device 1 and the basic viewing mode is set, an image identified by the received file name is read from the memory and then is displayed. The image selected by the user of the portable device 1 is the image photographed by the user of the portable device 1 or the image photographed by the user of the portable device 101, and thus the same image as the image selected by the user of the portable device 1 is also stored in the memory of the portable device 101.

The user of the portable device 1 can select an image using the selection mode, and thus it is possible for the user of the portable device 101 to view the same image as the image that is selected and viewed by the user of the portable device 1.

[Reaction Mode]

Figure 14:
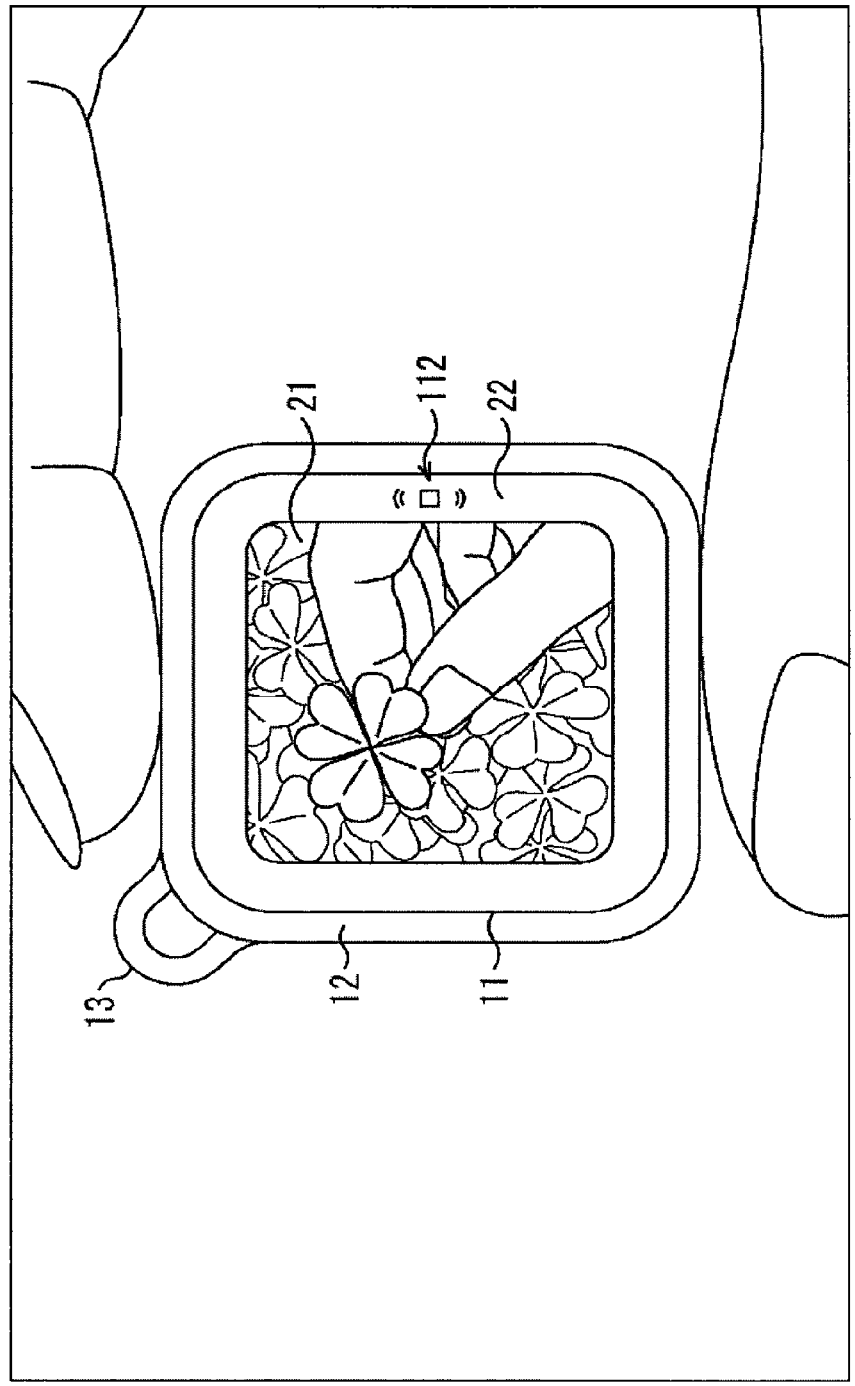
FIG. 14 is a diagram illustrating an example of display of a display in a reaction mode.

FIG. 14 is a diagram illustrating an example of display on the display 11 in the reaction mode.

The reaction mode is set when it is detected that the casing is shaken in a predetermined direction in a case where the basic viewing mode is set. The display of the area 21 in the reaction mode remains to be the same as the display in the basic viewing mode. In the area 21, for example, the synchronous image transmitted from the portable device 101 in the standby mode is displayed.

When the user holds the portable device 1 by pinching the top and bottom sides together, it becomes a state where only the reaction icon 112 of the camera icon 111 and the reaction icon 112 of FIG. 9 displayed on the left and right of the area 21, respectively, in the basic viewing mode is displayed.

Although not illustrated, when the user holds the portable device 1 by pinching the left and right sides together, it becomes a state where only the reaction icon 122 of the selection icon 121 and the reaction icon 122 of FIG. 10 displayed above and under the area 21, respectively, in the basic viewing mode is displayed.

When the casing is shaken in the state of FIG. 14, reaction is attached to an image in the area 21 depending on the direction in which the casing is shaken. In addition, the state of an image in the area 21 is changed to represent reaction attached by the user.

Figure 15:
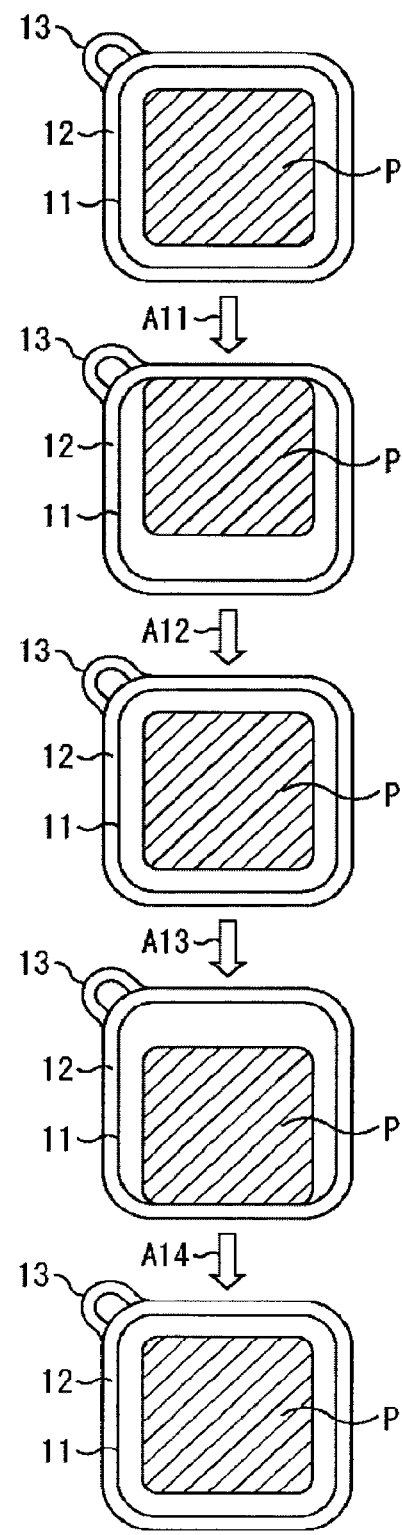
FIG. 15 is a diagram illustrating an example of display when a reaction that is shaken up and down is attached.

FIG. 15 is a diagram illustrating changes in the state of an image when the casing is shaken up and down, that is an example of display when reaction that is shaken up and down is attached. In FIG. 15, a range indicated by diagonal lines indicates a display range of an image P.

The state of the display 11 shown in the uppermost part of FIG. 15 is a state in which the image P is displayed in the area 21. In this state, when it is detected that the casing is shaken up and down, as shown by each point of the arrows A11 to A14, the image P is displayed on the display 11 by changing its position up and down in a way of changing it to the upper side, the center (position of the image 21), the lower side, and the center. Such display is continued for a predetermined period of time.

Figure 16:
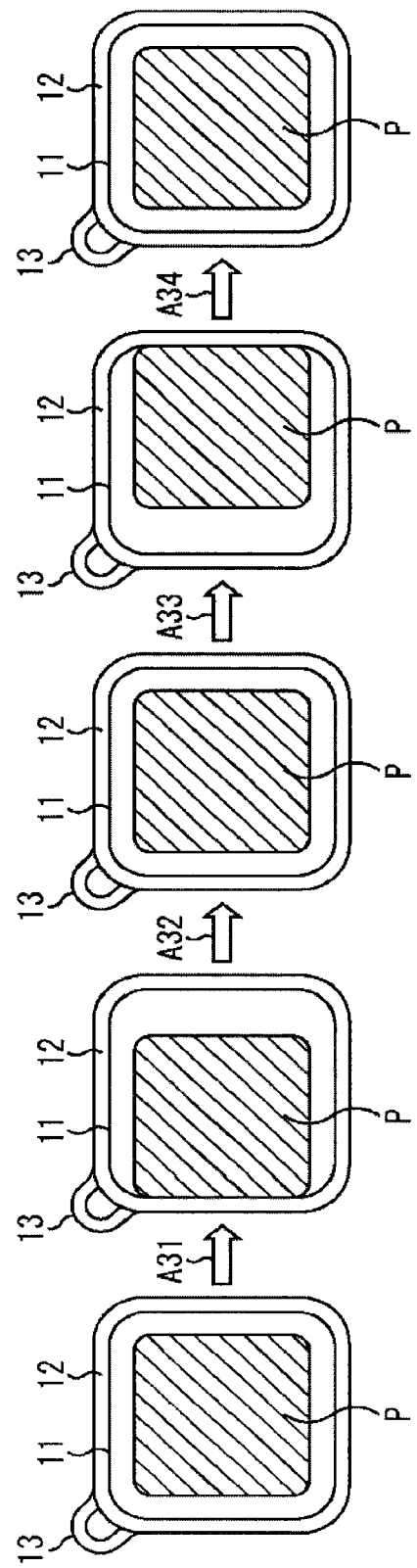
FIG. 16 is a diagram illustrating an example of display when a reaction that is shaken from side to side is attached.

FIG. 16 is a diagram illustrating changes in the state of an image when the casing is shaken from side to side, that is an example of display when reaction that is shaken from side to side is attached. The display of FIG. 16 is performed when the reaction mode is set in a state where the user holds the portable device 1 by pinching the left side and the right side.

The state of the display 11 shown in the leftmost part of FIG. 16 is a state in which the image P is displayed in the area 21. In this state, when it is detected that the casing is shaken from side to side, as shown by each point of the arrows A31 to A34, the image P is displayed on the display 11 by changing its position from side to side in a way of changing it to the left side, the center, the right side, and the center. Such display is continued for a predetermined time of period.

Reaction that can be attached to an image in the reaction mode is not limited to reaction that changes its display position as shown in FIGS. 15 and 16. For example, reaction that can be attached to an image may include reaction that displays an image in the extended or contracted state, and reaction that displays an image in the magnified or reduced state, depending on the shaken direction.

When reaction is attached in the reaction mode, a process in which the state of an image is changed and displayed in this way is performed, and also a file name of the image to which reaction is attached and reaction information are transmitted to the portable device 101. The reaction information contains information indicating the contents of reaction attached to an image by the user, such as information that indicates the direction in which the casing is shaken or information that indicates the period of time for which the casing is shaken.

In the portable device 101, when the portable device 101 receives the file name and reaction information transmitted from the portable device 1 and the basic viewing mode is set, an image identified by the file name is read from the memory and is displayed. In addition, a process for changing the state of the image displayed on the display 11 according to the reaction information transmitted from the portable device 1 is performed. The same image as the image displayed in the portable device 1 is displayed also in the portable device 101 by changing its state in the same manner.

Thus, the user of the portable device 1 can attach reaction to the image transmitted from the other party and return the image to the other party. In addition, the user of the portable device 101 can check reaction of the user of the portable device 1 with respect to the image that the user of the portable device 101 has transmitted. The users of the portable device 1 and the portable device 101 can communicate with each other through reaction.

[Transition Between Operation Modes]

Figure 17:
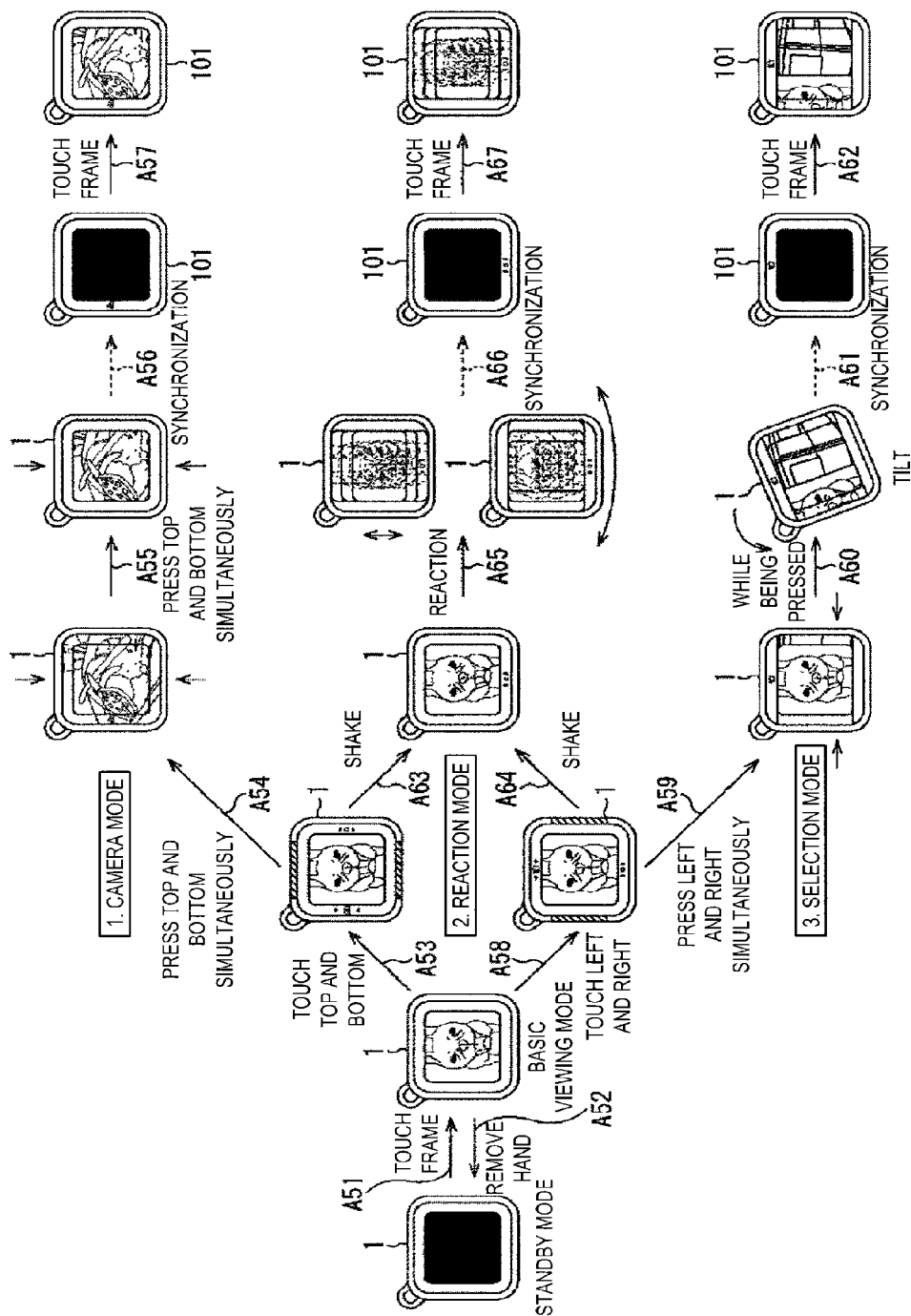
FIG. 17 is a diagram illustrating a series of transitions between the operation modes.

FIG. 17 is a diagram illustrating a series of transitions between operation modes as described above.

When the casing is touched in the standby mode as shown in the leftmost part of FIG. 17, as shown by the point of the arrow A51, the operation mode of the portable device 1 undergoes a transition to the basic viewing mode. A synchronous image such as an image transmitted from the portable device 101 in the standby mode is displayed on the display 11.

When the user removes his hand from the casing in the basic viewing mode, the operation mode of the portable device 1 undergoes a transition to the standby mode as shown by the point of the arrow A52.

When the user holds the portable device 1 by pinching the top and bottom sides and the switch 42T on the top side and the switch 42B on the bottom side are pressed simultaneously as indicated by diagonal lines at the point of the arrow A53, the operation mode of the portable device 1 undergoes a transition to the camera mode as shown by the point of the arrow A54.

When the switch 42T on the top side and the switch 42B on the bottom side are pressed simultaneously in the camera mode, photographing is performed as shown by the point of the arrow A55, and synchronization of the image obtained by photographing is performed as shown by the point of the arrow A56. The image obtained by photographing is transmitted to the portable device 101, and is received, for example, by the portable device 101 that is in the standby mode state.

When the user of the portable device 101 touches the casing of the portable device 101, the operation mode of the portable device 101 undergoes a transition to the basic viewing mode as shown by the point of the arrow A57. The image photographed by the user of the portable device 1 and transmitted from the portable device 1 is displayed on the display 11 of the portable device 101. Because the same image is also displayed in the portable device 101, the image photographed by the portable device 1 in the camera mode becomes a synchronous image.

On the other hand, when the user holds the portable device 1 by pinching the left and right sides and the switch 42L on the left side and the switch 42R on the right side are simultaneously pressed as indicated by diagonal lines at the point of the arrow A58, the operation mode of the portable device 1 undergoes a transition to the selection mode as shown by the point of the arrow A59.

When the casing is tilted while the switch 42L on the left side and the switch 42R on the right side are being pressed in the selection mode, switching of an image to be displayed is performed as shown by the point of the arrow A60.

When a predetermined image is selected, synchronization of the selected image is performed as shown by the point of the arrow A61. The file name of the image selected by the user of the portable device 1 is transmitted to the portable device 101, and is received, for example, by the portable device 101 that is in the standby mode state.

When the user of the portable device 101 touches the casing of the portable device 101, the operation mode of the portable device 101 undergoes a transition to the basic viewing mode as shown by the point of the arrow A62. The same image as the image identified based on the file name and selected by the user of the portable device 1 is displayed on the display 11 of the portable device 101. Because the same image is also displayed in the portable device 101, the image selected by the user of the portable device 1 in the selection mode becomes a synchronous image.

When the user holds the portable device 1 by pinching the top and bottom sides together and the switch 42L on the left side as shown by the point of the arrow A53 and the casing is shaken in this state, the operation mode of the portable device 1 undergoes a transition from the basic viewing mode to the reaction mode as shown by the point of the arrow A63.

Furthermore, when the user holds the portable device 1 by pinching the left and right sides together as shown by the point of the arrow A58 and the casing is shaken in this state, the operation mode of the portable device 1 undergoes a transition from the basic viewing mode to the reaction mode as shown by the point of the arrow A64.

When reaction is attached by shaking the casing from side to side or up and down in the reaction mode, synchronization is performed as shown by the point of the arrow A66. A file name of the image to which reaction is attached and reaction information are transmitted to the portable device 101, and are received, for example, by the portable device 101 that is in the standby mode state.

When the user of the portable device 101 touches the casing of the portable device 101, the operation mode of the portable device 101 undergoes a transition to the basic viewing mode as shown by the point of the arrow A67. The same image as the image which is identified based on the file name and to which reaction is attached by the user of the portable device 1 is displayed on the display 11 of the portable device 101 by changing its state according to the reaction information. Because the same image is also displayed in the portable device 101, the image to which reaction is attached by the user of the portable device 1 in the reaction mode becomes a synchronous image.

The operation of the portable device 1 that makes a transition of the operation mode as described above and performs the process according to the user's operation will be described later with reference to a flowchart.

<Exemplary Configuration of Portable Device>

Figure 18:
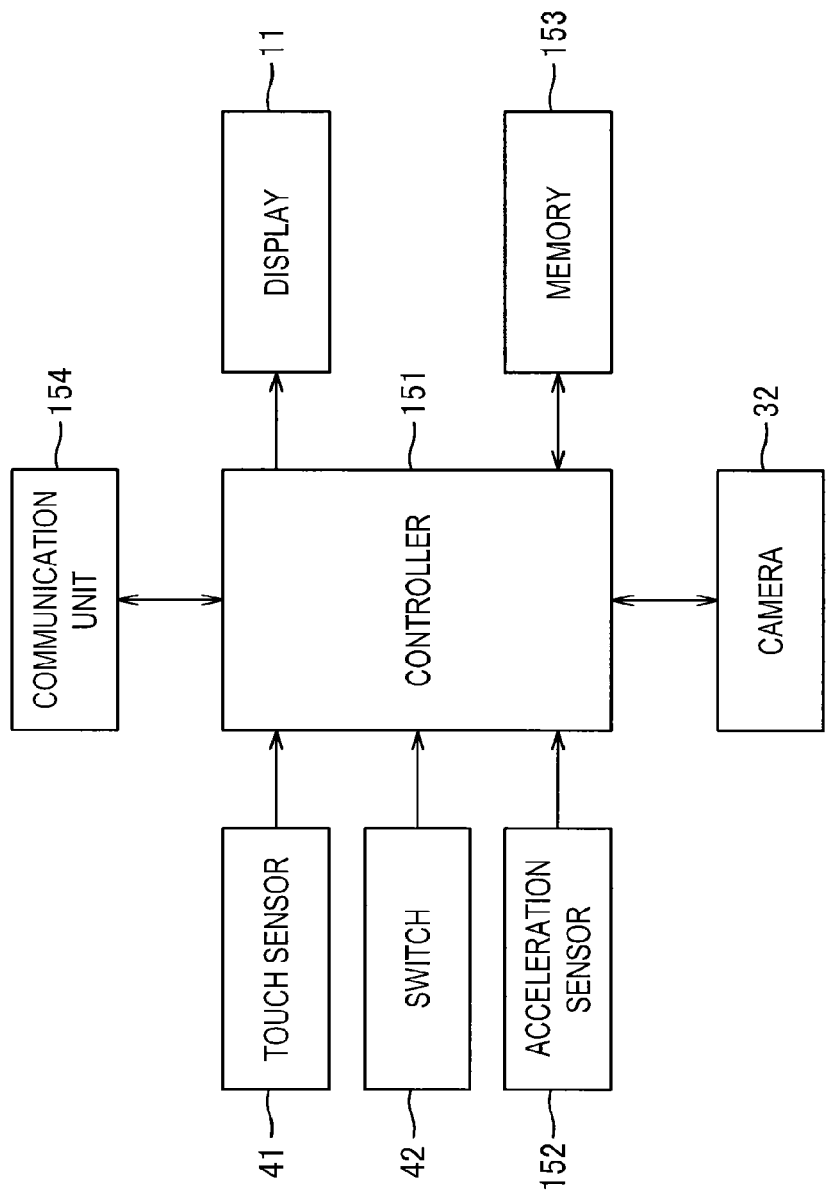
FIG. 18 is a block diagram illustrating an exemplary hardware configuration of the portable device.

FIG. 18 is a block diagram illustrating an exemplary hardware configuration of the portable device 1.

The portable device 1 is configured to include a controller 151, an acceleration sensor 152, a memory 153, and a communication unit 154, in addition to the display 11, the camera 32, the touch sensor 41, and the switch 42 described above.

The controller 151 executes a predetermined program and controls the entire operation of the portable device 1. For example, the controller 151 detects the user's operation based on a signal supplied from the touch sensor 41, the switch 42, and the acceleration sensor 152, and performs various processes by setting the operation mode corresponding to the detected operation.

The acceleration sensor 152 detects acceleration generated in the casing of the portable device 1 and outputs the detection result to the controller 151.

The memory 153 is made of a flash memory or the like and stores an image supplied from the controller 151. An image photographed by the camera 32 and an image transmitted from the portable device 101 and received by the communication unit 154 are stored in the memory 153. The image stored in the memory 153 is read by the controller 151, as appropriate.

The communication unit 154 communicates with the management server 103 under the control of the controller 151, and transmits an image which is photographed by the camera 32 and supplied from the controller 151, to the management server 103. In addition, the communication unit 154 receives an image transmitted from the management server 103 and outputs the received image to the controller 151.

Figure 19:
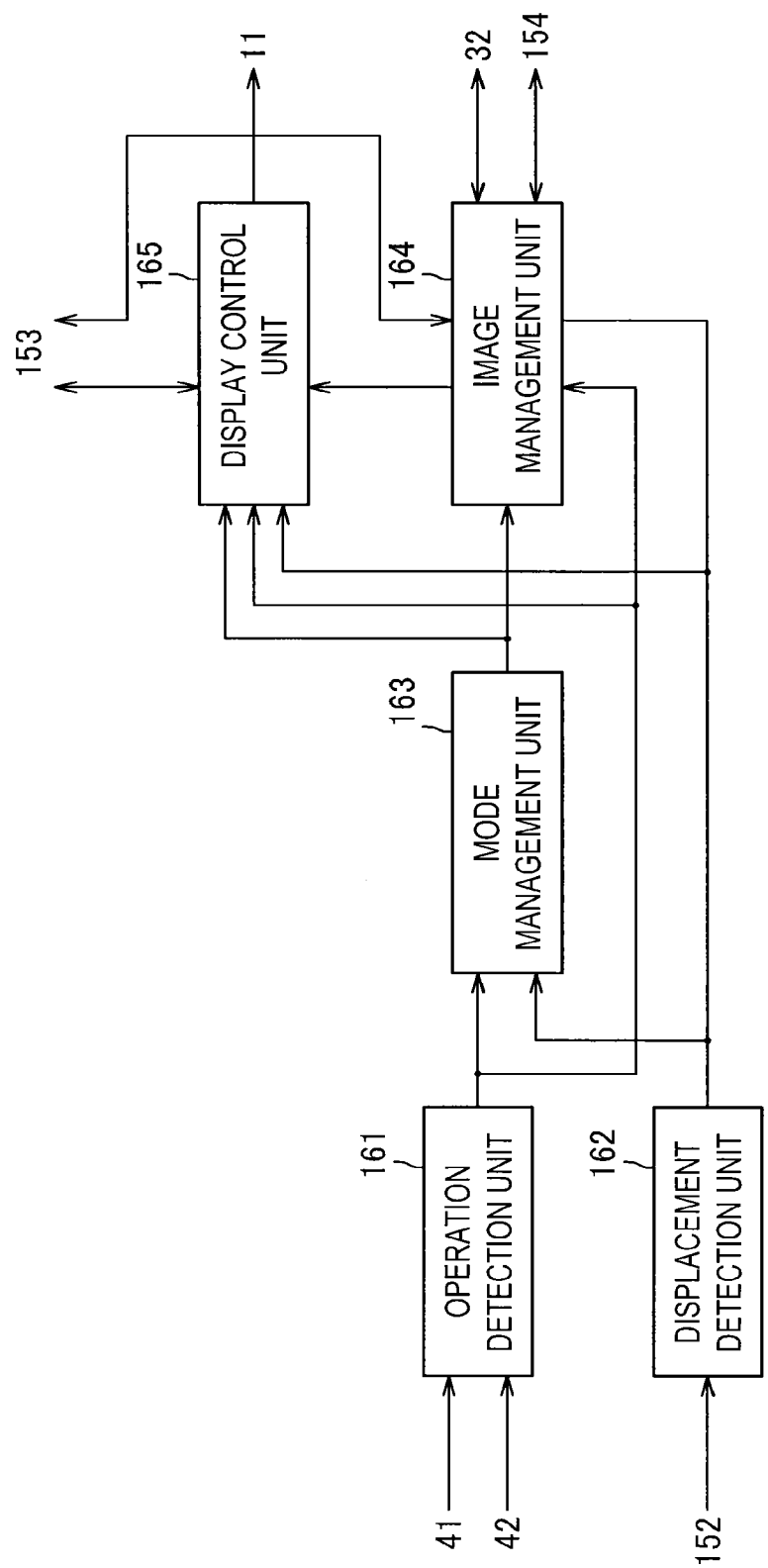
FIG. 19 is a block diagram illustrating an exemplary functional configuration of a controller.

FIG. 19 is a block diagram illustrating an exemplary functional configuration of the controller 151.

At least some of the function units shown in FIG. 19 are implemented by causing the controller 151 of FIG. 18 to execute a predetermined program. In the controller 151, an operation detection unit 161, a displacement detection unit 162, a mode management unit 163, an image management unit 164, and a display control unit 165 are implemented.

The operation detection unit 161 detects the touch of the user to the side face of the casing and a depressing operation of the switch 42 by the user, based on the output from the touch sensors 41 and the switches 42 which are respectively provided on the four side faces. The operation detection unit 161 outputs information indicating the contents of the detected user's operation to the mode management unit 163, the image management unit 164, and the display control unit 165.

The displacement detection unit 162 detects the direction of the casing of the portable device 1 and a displacement applied to the casing, based on acceleration detected by the acceleration sensor 152. For example, the displacement detection unit 162 detects the direction, magnitude or the like in which the casing is shaken. The displacement detection unit 162 outputs information indicating the direction of the casing and information indicating the displacement applied to the casing to the mode management unit 163, the image management unit 164, and the display control unit 165.

The mode management unit 163 makes a transition of the operation mode as described with reference to FIG. 17, based on the user's operation detected by the operation detection unit 161 and the direction of the casing and displacement applied to the casing which are detected by the displacement detection unit 162. The mode management unit 163 outputs information indicating that which operation mode of the standby, basic viewing, camera, selection, and reaction modes is being set to the image management unit 164 and the display control unit 165.

The image management unit 164 controls the camera 32, the memory 153, and the communication unit 154, based on the user's operation detected by the operation detection unit 161 and the direction of the casing and displacement applied to the casing which are detected by the displacement detection unit 162.

For example, when the camera mode is set by the mode management unit 163, the image management unit 164 outputs an image captured by the camera 32 to the display control unit 165 for displaying the image on the display 11. In addition, when the switch 42T in the top side and the switch 42B in the bottom side are pressed simultaneously, the image management unit 164 causes the memory to store the image captured by the camera 32 at that time and controls the communication unit 154 to transmit the image to the portable device 101.

When the selection mode is set by the mode management unit 163, the image management unit 164 controls the communication unit 154 to transmit a file name of an image selected by the user to the portable device 101.

When the reaction mode is set by the mode management unit 163, the image management unit 164 controls the communication unit 154 to transmit a file name of an image to which reaction is attached and reaction information to the portable device 101.

The image management unit 164 controls the communication unit 154 to receive the image transmitted from the portable device 101 and causes the memory to store the receive image in the standby mode.

The display control unit 165 controls display on the display 11, based on the user's operation detected by the operation detection unit 161 and the direction of the casing and displacement applied to the casing which are detected by the displacement detection unit 162.

For example, when the camera mode is set by the mode management unit 163, the display control unit 165 causes the display 11 to display the image captured by the camera 32 and supplied from the image management unit 164.

When the selection mode is set by the mode management unit 163, the display control unit 165 switches a display on the display 11 as described with reference to FIG. 13 each time when the casing is tilted while the switch 42L on the left side and the switch 42R on the right side are being pressed.

When the reaction mode is set by the mode management unit 163, the display control unit 165 changes the state of the image displayed on the display 11 in a way as described with reference to FIGS. 15 and 16, depending on shaking of the casing.

<Operation of Portable Device>

The operation of the portable device 1 having the configuration as described above will now be described. The same process is also performed in the portable device 101.

[Overall Operation]

Figure 20:
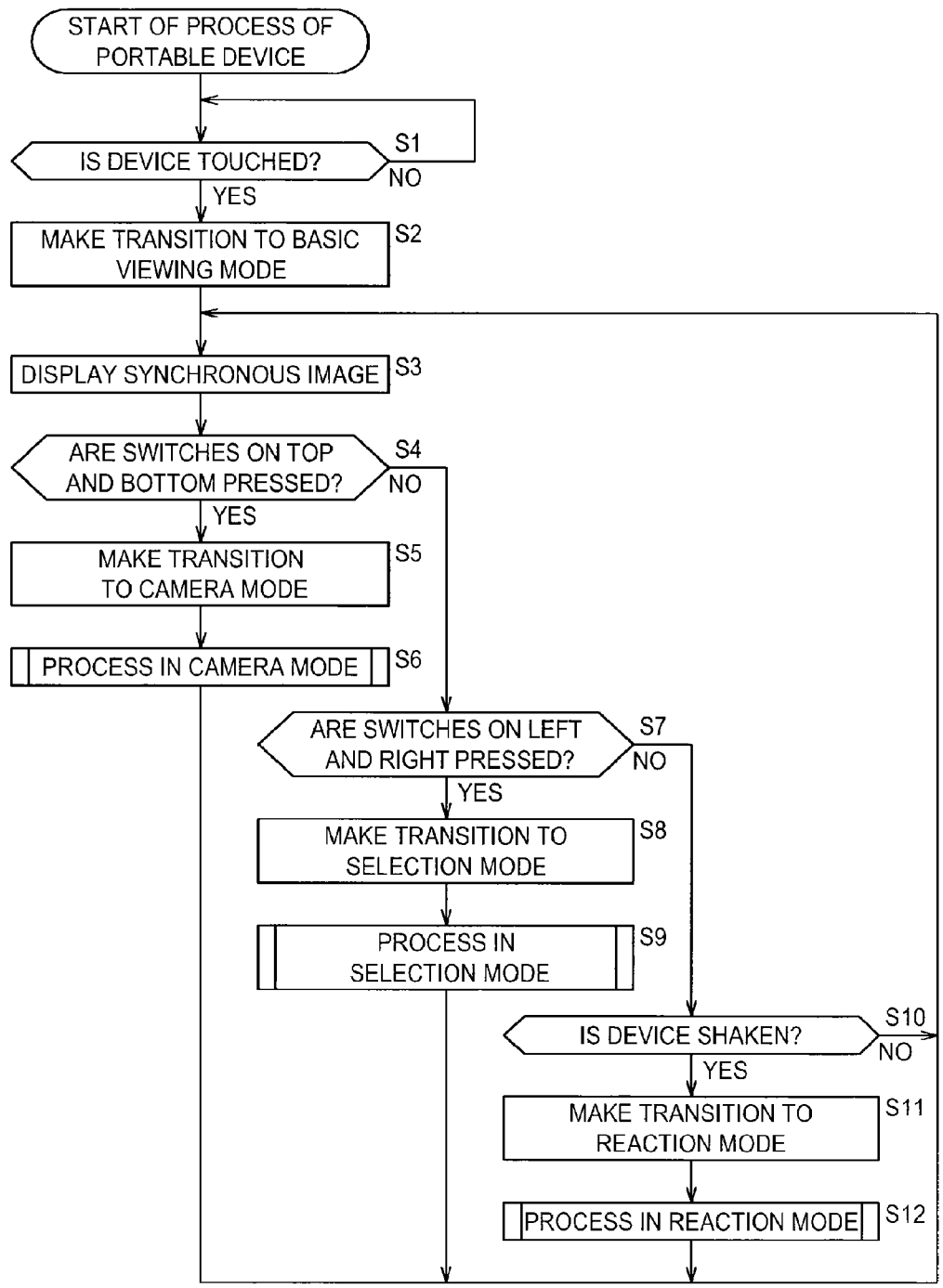
FIG. 20 is a flowchart for explaining a process of the portable device.

Referring to the flowchart of FIG. 20, the process of the portable device 1 that sets an operation mode according to the user's operation and performs a process of each operation mode will be first described. The process shown in FIG. 20 is started, for example, when the standby mode is set.

In step S1, the operation detection unit 161 determines whether the casing of the portable device 1 is touched based on the detection result obtained by the touch sensor 41 and stands by until it is determined that the casing is touched.

It is determined in step S1 that the casing is touched, the mode management unit 163 makes a transition of the operation mode of the portable device 1 to the basic viewing mode in step S2. When the casing of the portable device 1 is touched, information indicating such an event is supplied from the operation detection unit 161 to the mode management unit 163.

In step S3, the display control unit 165 causes the display 11 to display an image selected last as a synchronous image. For example, if the image photographed by the portable device 101 in the standby mode and transmitted from the portable device 101 is stored in the memory 153, then the image is read from the memory 153 and is displayed as a synchronous image.

In step S4, the operation detection unit 161 determines whether the switch 42T on the top side and the switch 42B on the bottom side are pressed simultaneously.

If it is determined in step S4 that the switch 42T on the top side and the switch 42B on the bottom side are pressed simultaneously, the mode management unit 163, in step S5, makes a transition of the operation mode of the portable device 1 to the camera mode.

In step S6, the process in the camera mode is performed by each unit. The process in the camera mode to be performed in step S6 will be described later with reference to the flowchart of FIG. 21.

On the other hand, if it is determined in step S4 that the switch 42T on the top side and the switch 42B of the bottom side are not pressed simultaneously, the mode management unit 163 determines in step S7 whether the switch 42L on the left side and the switch 42R on the right side are pressed simultaneously.

If it is determined in step S7 that the switch 42L on the left side and the switch 42R on the right side are pressed simultaneously, the mode management unit 163, in step S8, makes a transition of the operation mode of the portable device 1 to the selection mode.

In step S9, the process in the selection mode is performed by each unit. The process in the selection mode to be performed in step S9 will be described later with reference to the flowchart of FIG. 22.

On the other hand, if it is determined in step S7 that the switch 42L on the left side and the switch 42R on the right side are not pressed simultaneously, then, in step S10, the mode management unit 163 determines whether the casing of the portable device 1 is shaken based on the detection result obtained by the acceleration sensor 152.

If it is determined in step S10 that the casing of the portable device 1 is shaken, then, in step S11, the mode management unit 163 makes a transition of the operation mode of the portable device 1 to the reaction mode.

In step S12, the process in the reaction mode is performed by each unit. The process in the reaction mode to be performed in step S12 will be described later with reference to the flowchart of FIG. 23.

If it is determined in step S10 that the casing of the portable device 1 is not shaken, then the process is returned to step S3 and the processes described above are repeated. The step S3 and the subsequent processes are performed similarly after the process in the camera mode is performed in step S6, after the process in the selection mode is performed in step S9, and after the process in the reaction mode is performed in step S12.

[Process in Camera Mode]

Figure 21:
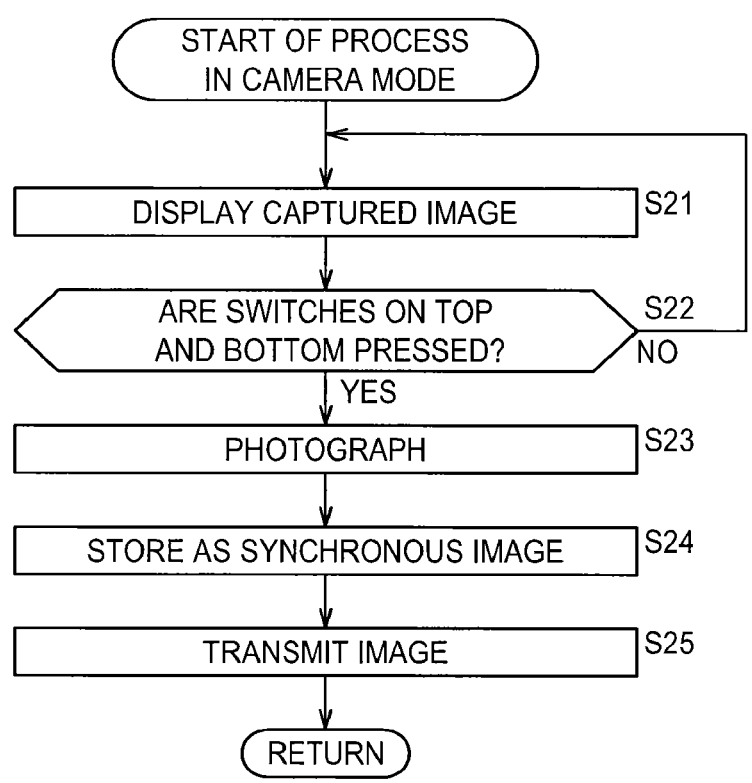
FIG. 21 is a flowchart for explaining a process in the camera mode to be performed in step S6 FIG. 20.

Next, referring to the flowchart of FIG. 21, the process to be performed in the camera mode performed in step S6 of FIG. 20 will be described.

In step S21, the display control unit 165 causes the display 11 to display the image captured by the camera 32 and supplied from the image management unit 164.

In step S22, the image management unit 164 determines whether the switch 42T on the top side and the switch 42B on the bottom side are pressed simultaneously. If it is determined in step S22 that the switch 42T on the top side and the switch 42B on the bottom side are not pressed simultaneously, then the process is returned to step S21 and display of the captured image is continued.

On the other hand, if it is determined in step S22 that the switch 42T on the top side and the switch 42B on the bottom side are pressed simultaneously, then, in step S23, the image management unit 164 causes the camera 32 to perform photographing.

In step S24, the image management unit 164 causes the memory 153 to store an image obtained by photographing as a synchronous image.

In step S25, the image management unit 164 controls the communication 154 to transmit the image obtained by photographing to the portable device 101. Then, the process is returned to step S6 of FIG. 20 and the subsequent processes are performed.

By the process described above, the user of the portable device 1 can transmit automatically an image photographed by using the camera 32 to the portable device 101 each time when photographing is performed without performing an operation for uploading or the like.

[Process in Selection Mode]

Figure 22:
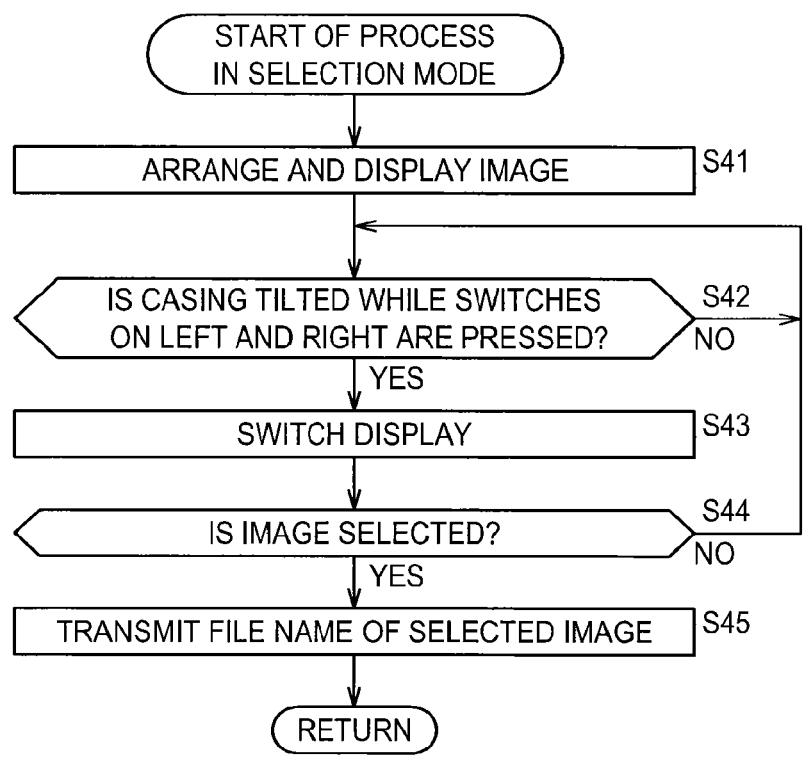
FIG. 22 is a flowchart for explaining a process in the selection mode to be performed in step S9 FIG. 20.

Next, referring to the flowchart of FIG. 22, the process in the selection mode to be performed in step S9 of FIG. 20 will be described.

In step S41, the display control unit 165 reads an image from the memory 153, and arranges and displays the read image as shown in FIG. 12.

In step S42, the display control unit 165 determines whether the casing is tilted while the switch 42L on the left side and the switch 42R on the right side are pressed and stands by until it is determined that the casing is tilted.

If it is determined in step S42 that the casing is tilted while the switch 42L on the left side and the switch 42R on the right side are pressed, then, in step S43, the display control unit 165 switches display of an image as described with reference to FIG. 13. Thus, a plurality of images are displayed by shifting their positions in conjunction with each other.

In step S44, the image management unit 164 determines whether an image is selected. If it is determined that there is no selected image in step S44, then the process is returned to step S42 and the subsequent processes are repeated.

On the other hand, if it is determined in step S44 there is a selected image, for example, by removing the fingers from the switch 42L on the left side and the switch 42R on the right side, then, in step S45, the image management unit 164 transmits a file name of the selected image to the portable device 101. Then, the process is returned to step S9 of FIG. 20 and the subsequent processes are performed.

By the process described above, the user of the portable device 1 can just view and select a predetermined image from among images exchanged with the other party, thereby transmitting automatically a file name of the image to the portable device 101.

[Process in Reaction Mode]

Figure 23:
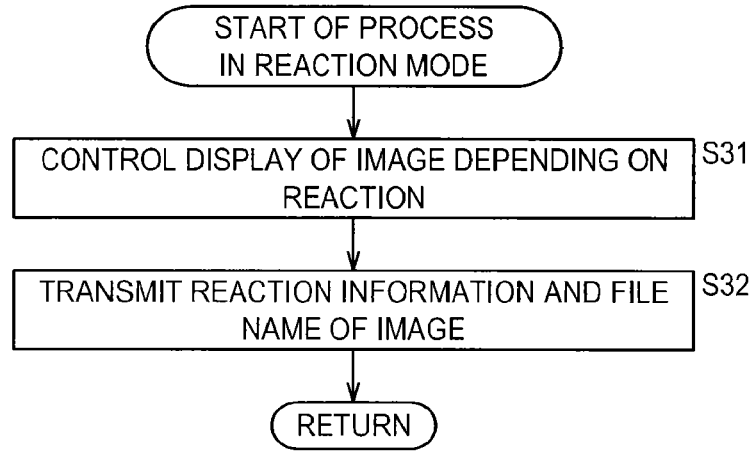
FIG. 23 is a flowchart for explaining a process in the reaction mode to be performed in step S12 FIG. 20.

Next, referring to the flowchart of FIG. 23, the process in the reaction mode to be performed in step S12 of FIG. 20 will be described.

In step 31, the display control unit 165 changes the state of an image on the display 11 depending on shaking of the casing to attach reaction to the image. The reaction can be inputted in a predetermined period of time such as several seconds.

In step S32, the image management unit 164 transmits reaction information and a file name of the image to which reaction is attached to the portable device 101. Then, the process is returned to step S12 of FIG. 20 and the subsequent processes are performed.

By the process described above, the user of the portable device 1 can attach his own reaction to an image transmitted from the other party and automatically transmit reaction information to the portable device 101.

[Process at Receiving]

Figure 24:
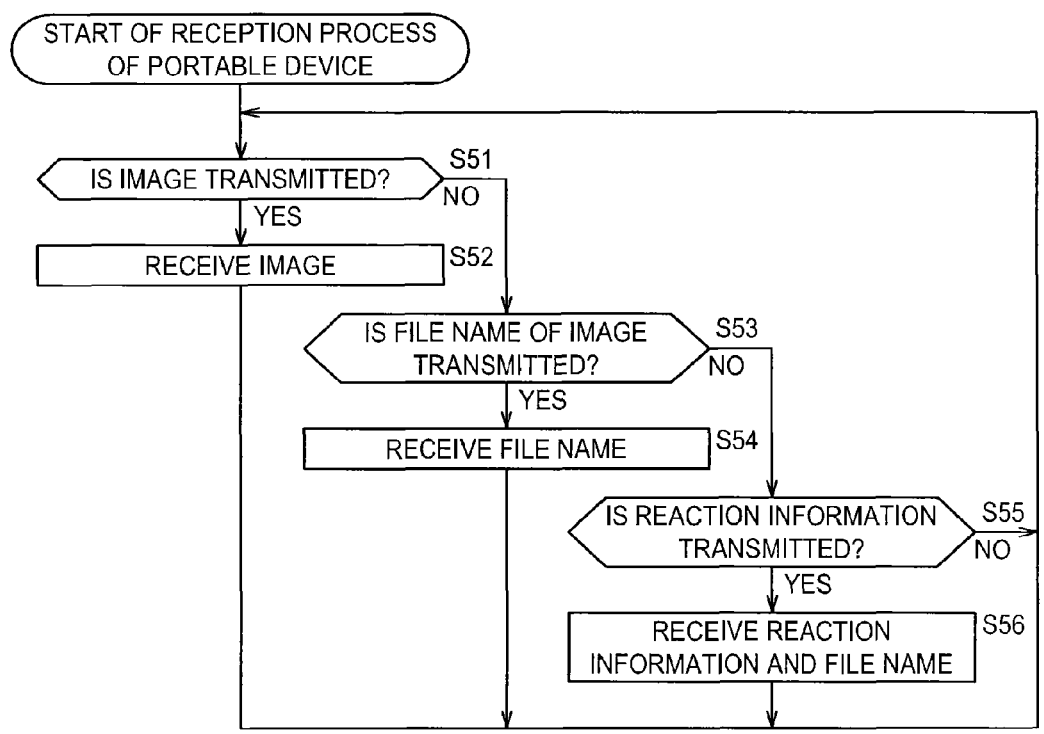
FIG. 24 is a flowchart for explaining a reception process of the portable device.

Next, referring to the flowchart of FIG. 24, the process of the portable device 1 that receives information transmitted from the portable device 101 will be described.

In step S51, the image management unit 164 determines whether an image photographed in the camera mode is transmitted from the portable device 101.

If it is determined in step S51 that the image is transmitted from the portable device 101, then, in step S52, the image management unit 164 receives the image transmitted from the portable device 101. The received image is supplied to the memory 153 and is stored therein.

Then, the process of FIG. 20 is performed, and when the basic viewing mode is set in step S2, the display control unit 165 causes the display 11 to display the image transmitted from the portable device 101 as a synchronous image. Displaying this synchronous image is performed in step S3.

On the other hand, if it is determined in step S51 that an image is not transmitted from the portable device 101, then, in step S53, the image management unit 164 determines whether a file name of the image selected in the selection mode is transmitted from the portable device 101.

If it is determined in step S53 that the file name of the image is transmitted, then, in step S54, the image management unit 164 receives the file name of the image transmitted from the portable device 101. The received file name is supplied to the memory 153 and is stored therein.

Then, the process of FIG. 20 is performed, and when the basic viewing mode is set in step S2, the display control unit 165 reads an image identified by the file name transmitted from the portable device 101 from the memory 153 and causes the display 11 to display the read image as a synchronous image. Displaying this synchronous image is performed in step S3.

On the other hand, if it is determined in step S53 that a file name of the image is not transmitted, then, in step S55, the image management unit 164 determines whether the portable device 101 transmits reaction information indicating reaction attached to an image in the reaction mode and a file name of the image to which reaction is attached.

If it is determined in step S55 that the reaction information and the file name of the image are transmitted, then, in step S56, the image management unit 164 receives the reaction information and the file name of the image. The received reaction information and file name are supplied to the memory 153 and are stored therein in association with each other.

Then, the process of FIG. 20 is performed, and when the basic viewing mode is set in step S2, the display control unit 165 causes the display 11 to display an image identified by the file name transmitted from the portable device 101 as a synchronous image in the form where reaction represented by the reaction information is attached. Displaying this synchronous image is performed in step S3.

After information transmitted from the portable device 101 in steps S52, S54 and S56 is received, or if it is determined in step S55 that the reaction information and the file name of the image are not transmitted, the process is returned to step S51 and the processes described above are repeated.

With the series of above processes, the user of the portable device 1 and the user of the portable device 101 can realize communication with each other using an image.

Modified Example

The exchange between the portable device 1 and the portable device 101 is performed via the management server 103 that manages the portable device 1 and the portable device 101 in association with each other, but it may be performed directly between both devices. In this case, information indicating that a device associated with the portable device 1 is the portable device 101 is registered in the portable device 1, and information indicating that a device associated with the portable device 101 is the portable device 1 is registered in the portable device 101. The association between devices may be performed, for example, by allowing the user to input identification information of one portable device to another portable device.

Furthermore, in the above examples, although the case where an image is synchronized between two portable devices has been described, an image may be synchronized between three or more portable devices.

Moreover, the synchronization of an image as described above is to be performed by a portable device having an appearance as described with reference to FIG. 1 or the like, but the synchronization may be performed by any portable terminal such as a smartphone. In this case, an application for implementing the synchronization of an image is installed in the portable device and the association between portable devices is performed, and then the synchronization of an image as described above is performed.

In the above examples, the camera mode is intended to be set when the switch 42T on the top side and the switch 42B on the bottom side are pressed, but the camera mode may be set when the switch 42L on the left side and the switch 42R on the right side are pressed. In addition, the selection mode is intended to be set when the switch 42L on the left side and the switch 42R on the right side are pressed, but the selection mode may be set when the switch 42T on the top side and the switch 42B on the bottom side are pressed.

[Exemplary Configuration of Computer]

The series of processes described above can be executed by hardware, but also can be executed by software. In case of executing the series of processes by software, for example, a program constituting this software is installed from a program-recording medium onto a computer incorporated into dedicated hardware, a general-purpose personal computer, or the like.

FIG. 25 is a block diagram illustrating an exemplary configuration of hardware of a computer for executing the above series of processes using a program.

A CPU (Central Processing Unit) 201, a ROM (Read Only Memory) 202, and a RAM (Random Access Memory) 203 are connected to each other via a bus 204.

The bus 204 is further connected to an input/output interface 205. The input/output interface 205 is connected to an input unit 206 including a keyboard, a mouse or the like, and is connected to an output unit 207 including a display, a loudspeaker or the like. In addition, the input/output interface 205 is connected to a storage unit 208 including a hard disk, a non-volatile memory or the like, a communication unit 209 including a network interface or the like, and a drive 210 for driving a removable medium 211.

In the computer configured as described above, for example, the CPU 201 loads the program stored in the storage unit 208 to the RAM 203 via the input/output interface 205 and the bus 204 and executes the program, thereby performing the above series of processes.

The program executed by the CPU 201, for example, is recorded on the removable medium 211, is provided through wired or wireless transmission medium such as a local area network, the Internet, and digital broadcasting, and is installed to the storage unit 208.

It should be noted that the program executed by a computer may be a program that is processed in time series according to the sequence described in this specification or a program that is processed in parallel or at necessary timing such as upon calling.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

[Combination Example of Configuration]

Additionally, the present technology may also be configured as below.

(1)

A portable device including:

a photographing unit;

a communication unit configured to transmit an image obtained through photographing by the photographing unit to another portable device managed in association with the portable device each time when photographing is performed, and configured to receive the image transmitted from the other portable device each time when photographing is performed in the other portable device; and a display unit configured to display the image transmitted from the other portable device and received by the communication unit.

(2)

The portable device according to (1), further including:

a storage unit configured to store the image obtained through photographing by the photographing unit and the image received by the communication unit; and a display control unit configured to select a predetermined image from among the images stored in the storage unit and to cause the display unit to display the selected image.

(3)

The portable device according to (2), wherein the display unit is provided in a front of a casing of the portable device, wherein the photographing unit is provided in a rear of the casing, and wherein the portable device further includes a detection unit configured to detect whether a user touches any opposed sides of top and bottom sides and left and right sides of the casing and whether a depression operation of opposed sides by the user is performed.

(4)

The portable device according to (3), wherein the display control unit causes the image received last by the communication unit to be displayed depending on a fact that it is detected that a user touches a side of the casing.

(5)

The portable device according to (4), wherein the photographing unit, when it is detected that the user touches one set of sides of top and bottom sides and left and right sides, performs photographing depending on a fact that the user performs a depression operation on the set of sides.

(6)

The portable device according to (5), further including:

a displacement detection unit configured to detect a change in a position applied to the casing.

(7)

The portable device according to (6), wherein the display control unit, when it is detected that the user touches the other set of sides, switches the image to be displayed on the display unit depending on detection of a change in position upon performing a depression operation on the other set of sides.

(8)

The portable device according to (7), wherein the communication unit transmits identification information of the image displayed by switching to the other portable device, and wherein the image identified by the identification information is displayed in the other portable device.

(9)

The portable device according to (7) or (8), wherein the display unit is configured by a self-light-emitting and light-transmissive type display, and wherein the display control unit causes one of the image to be displayed on an area which is provided with a light-shielding member in a rear side of an entire display area of the display unit, and causes a portion of another image to be displayed on an area which is not provided with the light-shielding member in a rear side of the entire display area of the display unit.

(10)

The portable device according to any one of (6) to (9), wherein the display control unit, when it is detected that the user touches the one set of sides or the other set of sides, changes a state of the image being displayed on the display unit depending on detection of the change in position.

(11)

The portable device according to (10), wherein the communication unit transmits identification information of the image displayed on the display unit and information regarding the detected change in position to the other portable device, and Wherein, in the other portable device, the image identified by the identification information is displayed, and a process for changing a state depending on the information regarding the change in position is performed.

(12)

The portable device according to (10) or (11), wherein the display unit is configured by a self-light-emitting and light-transmissive type display, and wherein the display control unit moves, within a range of the display area, a display position of one of the image displayed on an area which is provided with a light-shielding member in a rear side of an entire display area of the display unit.

(13)

The portable device according to any one of (3) to (12), wherein the display unit is configured by a self-light-emitting and light-transmissive type display, and wherein display control unit causes one of the image to be displayed on an area which is provided with a light-shielding member in a rear side of an entire display area of the display unit, and causes an icon to be displayed on an area which is not provided with the light-shielding member on a rear side of the entire display area of the display unit.

(14)

The portable device according to any one of (1) to (13), wherein the communication unit is connected to both the portable device and the other portable device via a network, transmits the image obtained by photographing to the other portable device via a management device, and receives the image transmitted from the other portable device, the management device being used to manage the portable device and the other portable device in association with each other.

(15)

An information processing method of a portable device, the method including:

photographing;

transmitting an image obtained through photographing to another portable device managed in association with the portable device each time when photographing is performed, and receiving the image transmitted from the other portable device each time when photographing is performed in the other portable device; and displaying the image which is transmitted from the other portable device and is received.

(16)

A program for causing a computer of a portable device to execute a process including:

photographing;

transmitting an image obtained through photographing to another portable device managed in association with the portable device each time when photographing is performed, and receiving the image transmitted from the other portable device each time when photographing is performed in the other portable device; and displaying the image which is transmitted from the other portable device and is received.

REFERENCE SIGNS LIST 1, 101 portable device
11 display
12 frame
32 camera
41T, 41B, 41L, 41R touch sensor
42T, 42B, 42L, 42R switch
151 controller
152 acceleration sensor
153 memory
154 communication unit
161 operation detection unit
162 displacement detection unit
163 mode management unit
164 image management unit
165 display control unit

The invention claimed is:

1. A portable device comprising:
 a housing;
 a self-light-emitting and light-transmissive display; and
 circuitry configured to
  control reception of an image transmitted from another device;
  control the display to display the image in an area which is provided with a light-shielding member in a rear side of an entire display area of the display;
  control the display to display a portion of another image in another area which is not provided with the light-shielding member in a rear side of the entire display area of the display; and
  control transmission of identification information of the displayed image to the other device in response to detecting a change in position of the housing, wherein
  the other device displays the image identified by the identification information.

2. The portable device according to claim 1, wherein the circuitry is further configured to
 control selection of a predetermined image from among stored images, and
 control the display to display the selected image.

3. The portable device according to claim 2, further comprising:
 a camera provided in a rear of the housing; and
 a sensor, controlled by the circuitry, that detects whether a user touches any of a top side, a bottom side, a left side or a right side of the housing and whether a depression operation on the sides is performed.

4. The portable device according to claim 3, wherein the circuitry controls the camera, when the circuitry detects the user touches on one of the sides of the housing, to capture a second image.

5. The portable device according to claim 4, further comprising:
 a displacement detection sensor controlled, by the circuitry, to detect change in the position of the housing.

6. The portable device according to claim 5, wherein the circuitry controls a change of the image displayed on the display according to the detected change in the position of the housing by the displacement detection sensor.

7. The portable device according to claim 1, wherein the change in position of the housing includes displacement of the housing by shaking the housing.

8. The portable device according to claim 5, wherein the circuitry, when the sensor detects that the user touches the one of the sides of the housing, controls a change of state of the image displayed by the display according to the detected change in position by the displacement detection sensor.

9. The portable device according to claim 8, wherein
 the circuitry controls transmission of information regarding the detected change in position to the other device, and
 the other device changes a state of the displayed image according to the information regarding the detected change in position.

10. The portable device according to claim 8, wherein
 the circuitry controls movement, within a range of the display area, of a display position of one of the images displayed on an area which is provided with a light-shielding member in a rear side of an entire display area of the display.

11. The portable device according to claim 3, wherein
 the circuitry controls the display to display an icon as the another image in the another area.

12. The portable device according to claim 1, wherein
 the circuitry is connected to the other device via a network, and
 the circuitry controls reception of the image via a management device, the management device used to manage the portable device and the other device in association with each other.

13. An information processing method of a portable device, the portable device having a housing including a front on which a self-light-emitting and light-transmissive display is provided, the method comprising:
 controlling, by circuitry of the portable device, reception of an image transmitted from another device;
 controlling, by the circuitry, the display to display the image in an area which is provided with a light-shielding member in a rear side of an entire display area of the display;
 controlling, by the circuitry, the display to display a portion of another image in another area which is not provided with the light-shielding member in a rear side of the entire display area of the display; and
 controlling, by the circuitry, transmission of identification information of the displayed image to the other device in response to detecting a change in position of the housing, wherein
 the other device displays the image identified by the identification information.

14. The information processing method according to claim 13, further comprising:
 controlling, by the circuitry, selection of a predetermined image from among stored images; and controlling, by the circuitry, the display to display the selected image.

15. The information processing method according to claim 14, further comprising:
   detecting whether a user touches any of a top side, a bottom side, a left side or a right side of the housing; and
   detecting whether a depression operation on the sides is performed.

16. The information processing method according to claim 15 further comprising:
   controlling, by the circuitry when the circuitry detects that the user touches one of the sides of the housing, a camera to capture a second image.

17. The information processing method according to claim 16, further comprising:
   detecting, by the circuitry, a change in the position of the housing.

18. The information processing method according to claim 17, further comprising:
   controlling, by the circuitry, a change of the image displayed on the display according to the detected change in the position of the housing.

19. A non-transitory computer readable medium storing computer readable instructions that, when executed by circuitry of a portable device, the portable device including a housing having a front on which a self-light-emitting and light-transmissive display is provided, cause the circuitry to execute a process comprising:
   controlling reception of an image transmitted from another device;
   controlling the display to display the image in an area which is provided with a light-shielding member in a rear side of an entire display area of the display;
   controlling the display to display a portion of another image in another area which is not provided with the light-shielding member in a rear side of the entire display area of the display; and
   controlling transmission of identification information of the displayed image to the other device in response to detecting a change in position of the housing, wherein the other device displays the image identified by the identification information.

* * * * *